(12) United States Patent
Zhu et al.

(10) Patent No.: US 11,632,505 B2
(45) Date of Patent: Apr. 18, 2023

(54) SOLID-STATE IMAGE SENSOR AND IMAGING DEVICE

(71) Applicant: Sony Semiconductor Solutions Corporation, Kanagawa (JP)

(72) Inventors: Hongbo Zhu, Tokyo (JP); Shin Kitano, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 17/290,035

(22) PCT Filed: Nov. 11, 2019

(86) PCT No.: PCT/JP2019/044089
§ 371 (c)(1),
(2) Date: Apr. 29, 2021

(87) PCT Pub. No.: WO2020/110676
PCT Pub. Date: Jun. 4, 2020

(65) Prior Publication Data
US 2021/0409625 A1 Dec. 30, 2021

(30) Foreign Application Priority Data

Nov. 29, 2018 (JP) .............................. JP2018-223479

(51) Int. Cl.
*H04N 5/351* (2011.01)
*H04N 5/3745* (2011.01)
*H04N 5/361* (2011.01)

(52) U.S. Cl.
CPC ......... *H04N 5/351* (2013.01); *H04N 5/37452* (2013.01); *H04N 5/361* (2013.01)

(58) Field of Classification Search
CPC .... H04N 5/351; H04N 5/37452; H04N 5/361; H04N 5/3675; H04N 5/341; H04N 5/3745; H04N 5/379
(Continued)

(56) References Cited

U.S. PATENT DOCUMENTS

2013/0258145 A1* 10/2013 Nakaseko .............. H04N 5/367
348/246
2015/0194454 A1* 7/2015 Kim .................. H01L 27/14638
250/208.1
(Continued)

FOREIGN PATENT DOCUMENTS

JP 2010-21858 A 1/2010
JP 2010-87668 A 4/2010
(Continued)

OTHER PUBLICATIONS

International Search Report (PCT/ISA/210), International Application No. PCT/JP2019/044089, dated Jan. 10, 2020.
(Continued)

*Primary Examiner* — Lin Ye
*Assistant Examiner* — Chan T Nguyen
(74) *Attorney, Agent, or Firm* — Michael Best & Friedrich LLP

(57) ABSTRACT

In a solid-state image sensor that detects presence or absence of an address event, erroneous detection of the address event is suppressed.
Each of a plurality of pixels executes detection processing for detecting whether or not a change amount of an incident light amount exceeds a predetermined threshold, and outputting a detection result. An abnormal pixel determination unit determines whether or not each of the plurality of pixels has an abnormality, and enables a pixel without an abnormality and disables a pixel with an abnormality. A control
(Continued)

unit performs control for causing the enabled pixel to execute detection processing and control for fixing the detection result of the disabled pixel to a specific value.

19 Claims, 32 Drawing Sheets

(58) Field of Classification Search
USPC .......................................................... 348/302
See application file for complete search history.

(56) References Cited

U.S. PATENT DOCUMENTS

2018/0262705 A1* 9/2018 Park ........................ H04N 5/341
2019/0141265 A1* 5/2019 Finateu ................ H04N 5/3745

FOREIGN PATENT DOCUMENTS

| JP | 2013-115547 A | 6/2013 |
| JP | 2013-211603 A | 10/2013 |
| JP | 2014-187516 A | 10/2014 |
| JP | 2018-186478 A | 11/2018 |

OTHER PUBLICATIONS

Notification of Transmittal of the International Search Report and the Written Opinion of the International Searching Authority, or the Declaration (PCT/ISA/220), International Application No. PCT/JP2019/044089, dated Jan. 28, 2020.

Written Opinion of the International Search Authority (PCT/ISA/237), International Application No. PCT/JP2019/044089, dated Jan. 28, 2020.

Huang, et al., "A Dynamic Vision Sensor with Direct Logarithmic Output and Full-Frame Picture-On-Demand" IEEE International Symposium on Circuits and Systems (ISCAS), May 2017.

* cited by examiner

SOLID-STATE IMAGE SENSOR AND IMAGING DEVICE

TECHNICAL FIELD

The present technology relates to a solid-state image sensor and an imaging device. More specifically, the present technology relates to a solid-state image sensor that compares a change amount of an incident light amount with a threshold, and an imaging device.

BACKGROUND ART

Conventionally, a synchronous solid-state image sensor for capturing image data (frame) in synchronization with a synchronous signal such as a vertical synchronous signal has been used in an imaging device or the like. The typical synchronous solid-state image sensor can acquire the image data only at each cycle (for example, 1/60 seconds) of the synchronous signal, and is thus difficult to deal with a case where higher-speed processing is required in the fields of transportation, robots, and the like. Therefore, an asynchronous solid-state image sensor provided with a detection circuit for each pixel, the detection circuit detecting that, for each pixel address, a change amount of a light amount of the pixel has exceeded a threshold as an address event in real time has been proposed (for example, see Non-Patent Document 1). Such a solid-state image sensor for detecting an address event for each pixel is called dynamic vision sensor (DVS).

CITATION LIST

Non-Patent Document

Non-Patent Document 1: Jing Huang, et al., A Dynamic Vision Sensor with Direct Logarithmic Output and Full-frame Picture-On-Demand, 2017 IEEE International Symposium on Circuits and Systems (ISCAS)

SUMMARY OF THE INVENTION

Problems to be Solved by the Invention

The above-described asynchronous solid-state image sensor (DVS) generates data at a much higher speed than the synchronous solid-state image sensor. However, in the above-described DVS, pixels with abnormal behavior may occur due to various factors such as dark current noise and defective elements. For example, an address event is erroneously detected even though there is no change in the incident light. When such an abnormal pixel erroneously detects an address event, various adverse effects such as a decrease in image recognition accuracy and an increase in power consumption may occur.

The present technology has been made in view of such a situation, and an object is to suppress erroneous detection of an address event in a solid-state image sensor that detects the presence or absence of an address event.

Solutions to Problems

The present technology has been made to solve the above-described problem and the first aspect is a solid-state image sensor including a plurality of pixel circuits each configured to execute detection processing of detecting whether or not a change amount of an incident light amount exceeds a predetermined threshold and outputting a detection result, an abnormal pixel determination unit configured to determine whether or not each of the plurality of pixel circuits has an abnormality, and set a pixel circuit without the abnormality to be enabled and set a pixel circuit with the abnormality to be disabled, and a control unit configured to perform control of causing the pixel circuit set to be enabled to execute the detection processing and control of fixing the detection result of the pixel circuit set to be disabled to a specific value. This brings about an effect that the detection result of the abnormal pixel circuit is fixed.

Furthermore, in the first aspect, each of the plurality of pixel circuits may include a logarithmic response unit in which a photoelectric conversion element configured to generate a photocurrent by photoelectric conversion and a current-voltage conversion unit configured to convert the photocurrent into a voltage are arranged, a buffer configured to output the voltage, a differentiator circuit configured to generate a differential signal indicating a change amount of the output voltage by differential operation, a comparator configured to compare the differential signal with the threshold, and a transfer unit configured to transfer a comparison result of the comparator as the detection result, and any of the logarithmic response unit, the buffer, the differentiator circuit, and the comparator may include a switch that opens or closes a predetermined path according to control of the control unit. This brings about an effect that the detection result is fixed by the switch Furthermore, in the first aspect, the control unit may control the switch of the pixel circuit set to be disabled to be in an open state. This brings about an effect that the detection result is fixed by the switch in the open state.

The switch may be inserted between the photoelectric conversion element and the current-voltage conversion unit. This brings about an effect that the photoelectric conversion element is cut off.

Furthermore, in the first aspect, the current-voltage conversion unit may include a transistor and a switch connected in series to the photoelectric conversion element, and the switch may be inserted in at least one of a path between the photoelectric conversion element and the transistor or a path between the transistor and a power supply terminal. This brings about an effect that the current is cut off.

Furthermore, in the first aspect, the buffer may include first and second transistors connected in series, and the switch may be inserted at least one of between the first and second transistors or between a connection point of the first and second transistors and the differentiator circuit. This brings about an effect that an output voltage of the buffer is cut off.

Furthermore, in the first aspect, the differentiator circuit may include a capacitance configured to output a charge according to the change amount of the voltage to a predetermined input terminal, and an inverting circuit configured to output a signal of an inverted voltage of the input terminal as the differential signal, and the switch may be inserted between the capacitance and the input terminal. This brings about an effect that the differential signal is cut off.

Furthermore, in the first aspect, the switch may be inserted between an output node of the comparator and the transfer unit. This brings about an effect that the comparison result of the comparator is cut off.

Furthermore, in the first aspect, the control unit may control the switch of the pixel circuit set to be disabled to be in a close state. This brings about an effect that the detection result is fixed by the switch in the close state.

Furthermore, in the first aspect, the switch may be inserted between a connection point of the current-voltage conversion unit and the photoelectric conversion element and a predetermined reference terminal. This brings about an effect that an input side of the current-voltage conversion unit is short-circuited.

Furthermore, in the first aspect, the switch may be inserted between a connection point of the current-voltage conversion unit and the buffer and a predetermined reference terminal. This brings about an effect that an output side of the current-voltage conversion unit is short-circuited.

Furthermore, in the first aspect, the switch may be inserted between a connection point of the buffer and the differentiator circuit and a predetermined reference terminal. This brings about an effect that an output terminal of the buffer is short-circuited.

Furthermore, in the first aspect, the differentiator circuit may include a capacitance configured to output a charge according to the change amount of the voltage to a predetermined input terminal, and an inverting circuit configured to output a signal of an inverted voltage of the input terminal as the differential signal, and the switch may be inserted between the input terminal and an output terminal of the inverting circuit. This brings about an effect that the differentiator circuit is initialized.

Furthermore, in the first aspect, the differentiator circuit may include a capacitance configured to output a charge according to the change amount of the voltage to a predetermined input terminal, an inverting circuit configured to output a signal of an inverted voltage of the input terminal as the differential signal, and a short-circuit transistor configured to short-circuit the input terminal and an output terminal of the inverting circuit according to an auto-zero signal from the transfer unit, the auto-zero signal instructing initialization, and the switch may be inserted between a gate of the short-circuit transistor and the transfer unit. This brings about an effect that the differentiator circuit is initialized.

Furthermore, in the first aspect, the switch may be inserted between an output terminal of the comparator and a predetermined terminal. This brings about an effect that the output terminal of the comparator is short-circuited.

Furthermore, in the first aspect, the abnormal pixel determination unit may determine whether or not each of the plurality of pixel circuits has an abnormality before execution of the detection processing. This brings about an effect that the presence or absence of abnormalities due to static factors is determined.

Furthermore, in the first aspect, the abnormal pixel determination unit may determine whether or not each of the plurality of pixel circuits has an abnormality during execution of the detection processing. This brings about an effect that the presence or absence of abnormalities due to dynamic factors is determined.

Furthermore, in the first aspect, the abnormal pixel determination unit may include a plurality of abnormal pixel determination circuits, the plurality of abnormal pixel determination circuits may be arranged in pixels different from one another, and the plurality of pixel circuits may be arranged in pixels different from one another. This brings about an effect that the presence or absence of an abnormality is determined by the circuit provided for each pixel.

Furthermore, in the first aspect, the above specific value may be a value indicating that the change amount does not exceed the threshold. This brings about an effect that the detection result is fixed to a value of when an address event does not occur.

Furthermore, the second aspect of the present technology is an imaging device including a plurality of pixel circuits each configured to execute detection processing of detecting whether or not a change amount of an incident light amount exceeds a predetermined threshold and outputting a detection result, an abnormal pixel determination unit configured to determine whether or not each of the plurality of pixel circuits has an abnormality, and set a pixel circuit without the abnormality to be enabled and set a pixel circuit with the abnormality to be disabled, a control unit configured to perform control of causing the pixel circuit set to be enabled to execute the detection processing and control of fixing the detection result of the pixel circuit set to be disabled to a specific value, and a signal processing unit configured to process the detection result. This brings about an effect that the detection result of the pixel circuit without an abnormality is processed, and the detection result of the pixel circuit with an abnormality is fixed.

MODE FOR CARRYING OUT THE INVENTION

Hereinafter, modes for implementing the present technology (hereinafter referred to as embodiments) will be described. Description will be given according to the following order.

1. First Embodiment (an example of setting each pixel to be enabled or disabled)
2. Second Embodiment (an example of adding a switch and setting each pixel to be enabled or disabled)
3. Third Embodiment (an example of changing a position of a switch and setting each pixel to be enabled or disabled)
4. Fourth Embodiment (an example of setting each pixel to be enabled or disabled during detection of an address event)
5. Fifth Embodiment (an example of executing a program for determining the presence or absence of an abnormality and setting each pixel to be enabled or disabled)
6. Applications to Moving Bodies 1. First Embodiment

[Configuration Example of Imaging Device]

Figure 1:
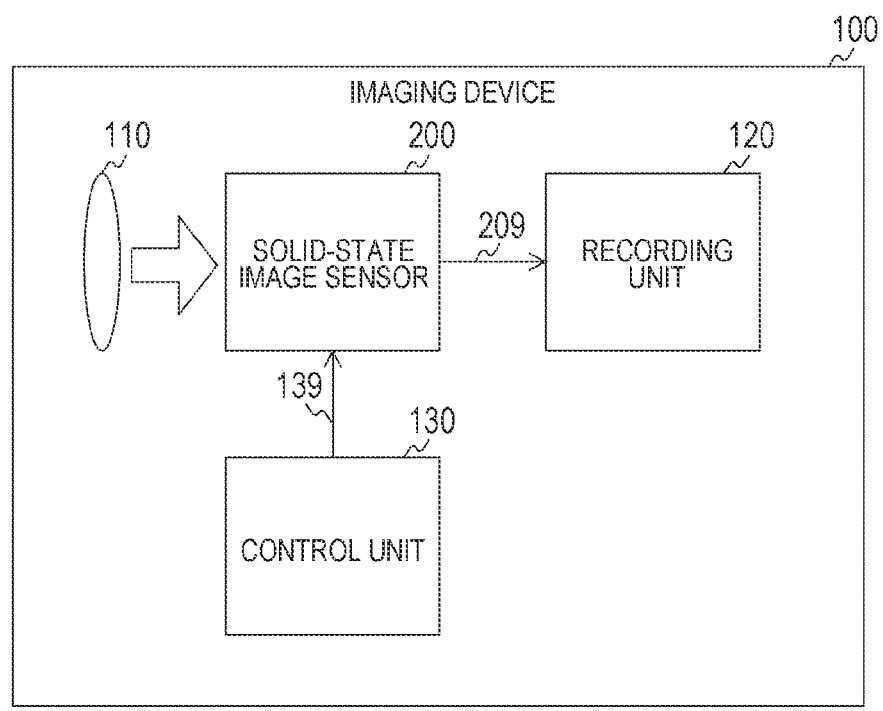
FIG. 1 is a block diagram illustrating a configuration example of an imaging device according to a first embodiment of the present technology.

FIG. 1 is a block diagram illustrating a configuration example of an imaging device 100 according to a first embodiment of the present technology. The imaging device 100 includes an imaging lens 110, a solid-state image sensor 200, a recording unit 120, and a control unit 130. As the imaging device 100, a camera mounted on an industrial robot, an in-vehicle camera, or the like is assumed.

The imaging lens 110 condenses incident light and guides the incident light to the solid-state image sensor 200. The solid-state image sensor 200 photoelectrically converts the incident light to detect the presence or absence of an address event, and generates a detection result of the detection. Here, the address event includes an on-event and an off-event, and the detection result includes a one-bit on-event detection result and a one-bit off-event detection result. The on-event means that a change amount of an incident light amount has exceeded a predetermined upper limit threshold. Meanwhile, the off-event means that the change amount of the light amount has fallen below a predetermined lower limit threshold. The solid-state image sensor 200 processes the detection result of the address event and outputs data indicating a processing result to the recording unit 120 via a signal line 209. Note that the solid-state image sensor 200 may detect only one of the on-event and the off-event.

The recording unit 120 records the data from the solid-state image sensor 200. The control unit 130 controls the solid-state image sensor 200 to detect the presence or absence of an address event.

[Configuration Example of Solid-State Image Sensor]

Figure 2:
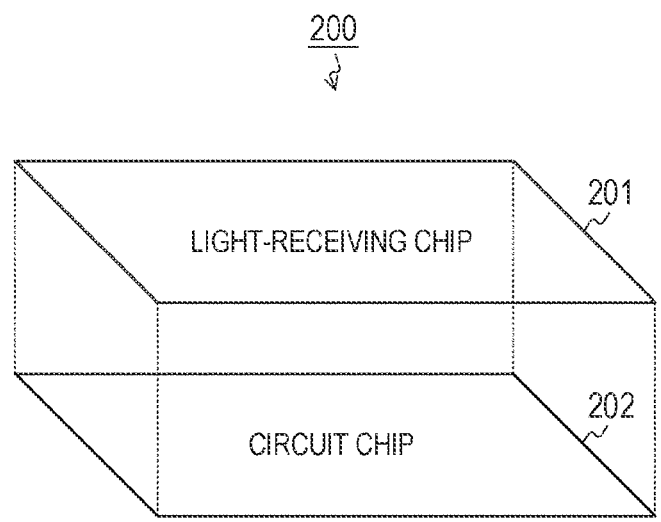
FIG. 2 is a diagram illustrating an example of a stacked structure of a solid-state image sensor according to the first embodiment of the present technology.

FIG. 2 is a diagram illustrating an example of a stacked structure of the solid-state image sensor 200 according to the first embodiment of the present technology. The solid-state image sensor 200 includes a circuit chip 202 and a light-receiving chip 201 stacked on the circuit chip 202. These chips are electrically connected via a connection part such as a via. Note that Cu—Cu bonding or bump can be used for connection in addition to the via.

Figure 3:
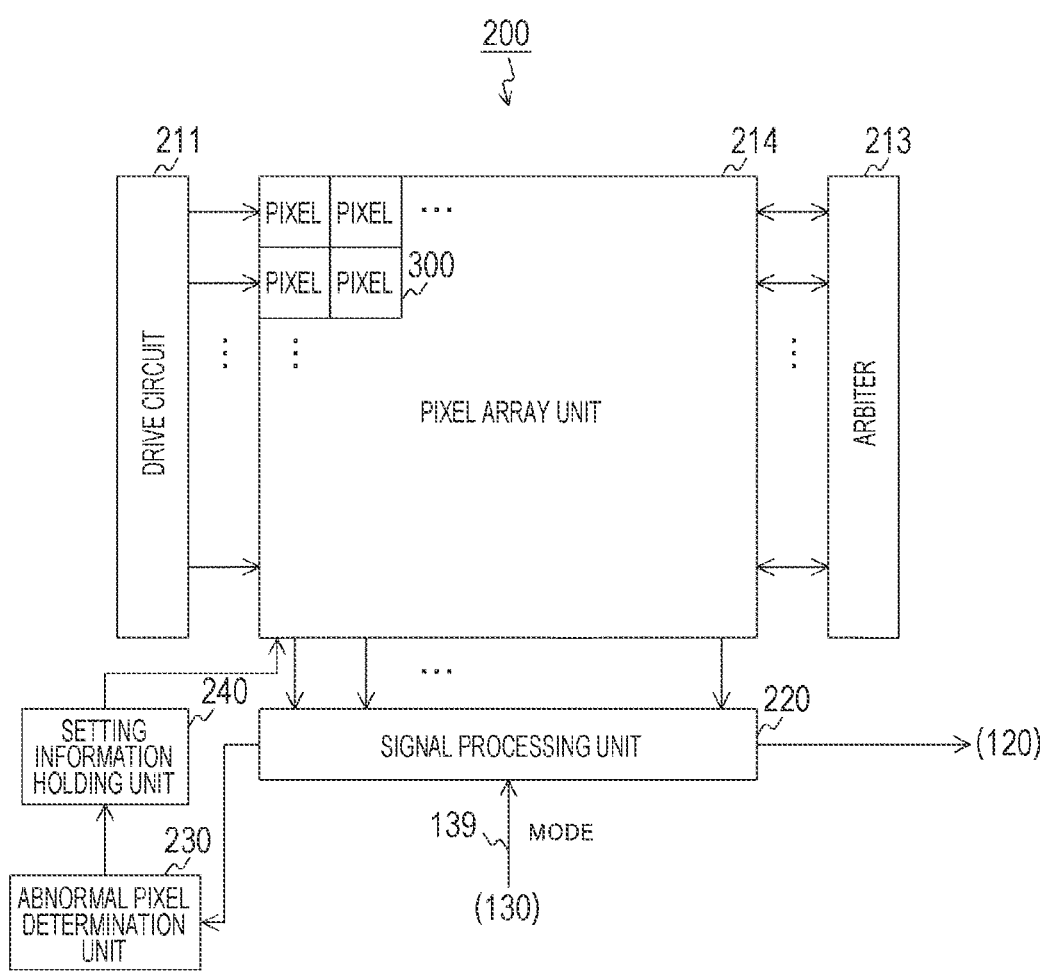
FIG. 3 is a block diagram illustrating a configuration example of the solid-state image sensor according to the first embodiment of the present technology.

FIG. 3 is a block diagram illustrating a configuration example of the solid-state image sensor 200 according to the first embodiment of the present technology. The solid-state image sensor 200 includes a drive circuit 211, an arbiter 213, a pixel array unit 214, a signal processing unit 220, an abnormal pixel determination unit 230, and a setting information holding unit 240. In the pixel array unit 214, a plurality of pixels 300 is arrayed in a two-dimensional lattice manner.

The pixel 300 detects the presence or absence of an address event on the basis of setting information held in the setting information holding unit 240. When detecting an address event, the pixel 300 supplies a request for requesting transfer of a detection signal indicating a detection result to the arbiter 213. Then, when receiving a response to the request, the pixel 300 supplies the detection signal to the signal processing unit 220.

The arbiter 213 arbitrates requests from respective pixel blocks, and transmits a response to the pixel 300 on the basis of an arbitration result.

The signal processing unit 220 executes predetermined signal processing such as image recognition processing for the detection signal from the pixel array unit 214. A mode signal MODE from the control unit 130 is input to the signal processing unit 220. The mode signal MODE is a signal indicating one of a plurality of modes including a detection mode and an abnormality determination mode. In the detection mode, the solid-state image sensor 200 detects the presence or absence of an address event for each pixel. Meanwhile, in the abnormality determination mode, whether or not the pixel is abnormal is determined for each pixel.

Here, the "abnormality" means that the behavior of the pixel is different from that assumed in the design. For example, when a large number of address events occur even though there is no change in the incident light amount, the pixels blink in the image data in which the detection results of the address events are arrayed. Further, when the state in which the address event occurs continues even though there is a change in the incident light amount, the pixel becomes a white spot in the image data. Furthermore, in a case where a pixel receives a flicker light source, an address event periodically occurs regardless of the presence or absence of a change in light from an object other than the light source, and the pixel blinks. These behaviors are treated as abnormal behaviors.

Factors that cause such abnormalities can be divided into static factors and dynamic factors. As the static factors, noise such as dark current noise, product variation of an element, defective element in the pixel, and the like are assumed. As the dynamic factors, aging deterioration, irradiation with a flicker light source, and the like are assumed.

The signal processing unit 220 executes signal processing for the detection signal in the detection mode, and supplies processed data to the recording unit 120. Meanwhile, in the abnormality determination mode, the signal processing unit 220 supplies the detection signal to the abnormal pixel determination unit 230.

The abnormal pixel determination unit 230 determines, for each pixel, whether or not the pixel is abnormal. The abnormality determination in the abnormality determination mode is executed, for example, before address event detection processing, for example, at the time of shipment from a factory or at the time of repair. In the abnormality determination mode, the abnormal pixel determination unit 230 generates setting information setting pixels without abnormality to be enabled and pixels with abnormality to be disabled, and causes the setting information holding unit 240 to hold the setting information. This setting information includes one-bit enable information indicating whether or not the pixel is enabled for each pixel. For example, in a case where the number of pixels is N, N-bit setting information is held.

By the abnormal pixel determination unit 230 determining the presence or absence of an abnormality in advance before the address event detection processing, erroneous detection of an address event due to the static factors such as a defective element can be suppressed. Note that a method for suppressing erroneous detection of an address event due to the dynamic factors such as irradiation with a flicker light source irradiation will be described below.

The setting information holding unit 240 holds the setting information. The setting information holding unit 240 includes, for example, a memory that cannot be rewritten. A read only memory (ROM), an eFuse register, or the like is used as the non-rewritable memory. Furthermore, the setting information holding unit 240 supplies each enable information in the held setting information to the corresponding pixel, thereby causing the pixel set to be enabled to execute the address event detection processing, and fixes the detection signal of the pixel set to be disabled to a specific value. Note that the setting information holding unit 240 is an example of a control unit described in the claims.

The drive circuit 211 drives each of the pixels 300. The arbiter 213 arbitrates requests from the pixel array unit 214 and returns a response on the basis of an arbitration result.

[Configuration Example of Pixel]

Figure 4:
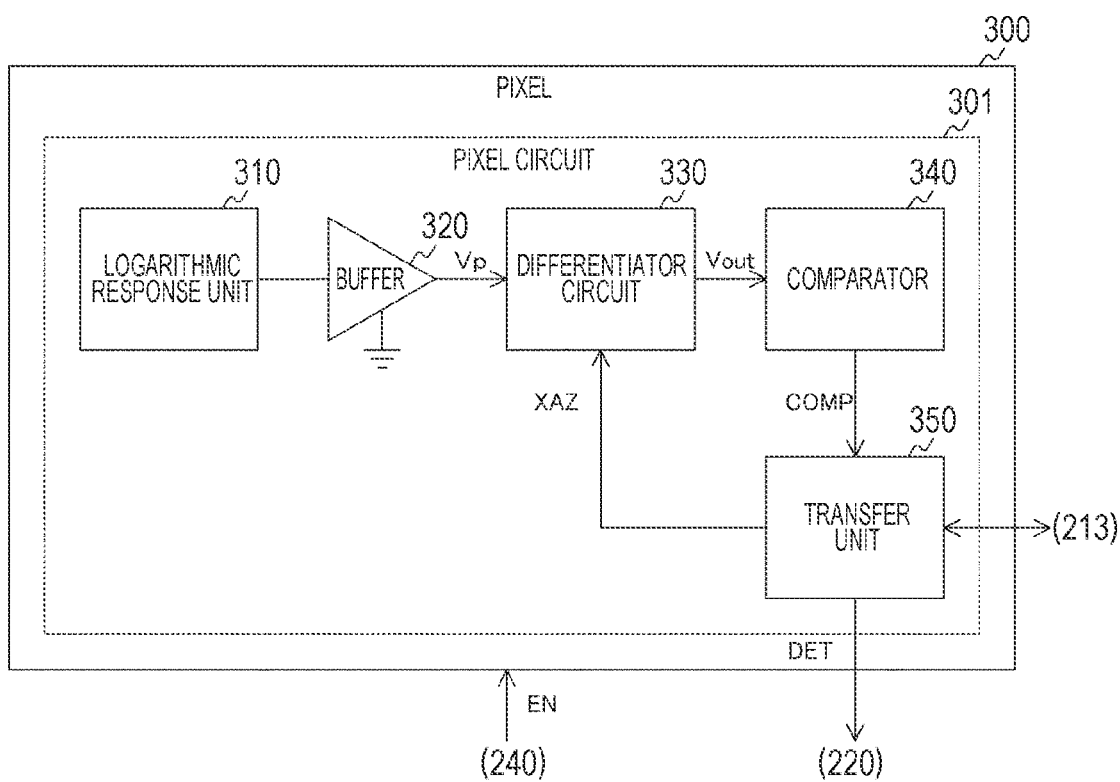
FIG. 4 is a block diagram illustrating a configuration example of a pixel according to the first embodiment of the present technology.

FIG. 4 is a block diagram illustrating a configuration example of the pixel 300 according to the first embodiment of the present technology. The pixel 300 is provided with a pixel circuit 301, and a logarithmic response unit 310, a buffer 320, a differentiator circuit 330, a comparator 340, and a transfer unit 350 are arranged in the pixel circuit 301.

The logarithmic response unit 310 converts a photocurrent into a pixel voltage Vp proportional to a logarithmic value of the photocurrent. The logarithmic response unit 310 supplies the pixel voltage Vp to the buffer 320.

The buffer 320 outputs the pixel voltage Vp from the logarithmic response unit 310 to the differentiator circuit 330. The buffer 320 can improve a drive force for driving a rear stage. Furthermore, the buffer 320 can secure isolation of noise associated with a rear-stage switching operation.

The differentiator circuit 330 obtains the change amount of the pixel voltage Vp by differential operation. The change amount of the pixel voltage Vp indicates the change amount of the light amount. The differentiator circuit 330 supplies a differential signal Vout indicating the change amount of the light amount to the comparator 340.

The comparator 340 compares the differential signal Vout with the predetermined threshold (upper limit threshold or lower limit threshold). A comparison result COMP of the comparator 340 indicates the detection result of the address event. The comparator 340 supplies the comparison result COMP to the transfer unit 350.

The transfer unit 350 transfers a detection signal DET and supplies an auto-zero signal XAZ to the differentiator circuit 330 for initialization after the transfer. The transfer unit 350 supplies a request for requesting transfer of the detection signal DET to the arbiter 213 when the address event is detected. Then, when receiving a response to the request, the transfer unit 350 supplies the comparison result COMP as the detection signal DET to the signal processing unit 220 and supplies the auto-zero signal XAZ to the differentiator circuit 330.

Figure 5:
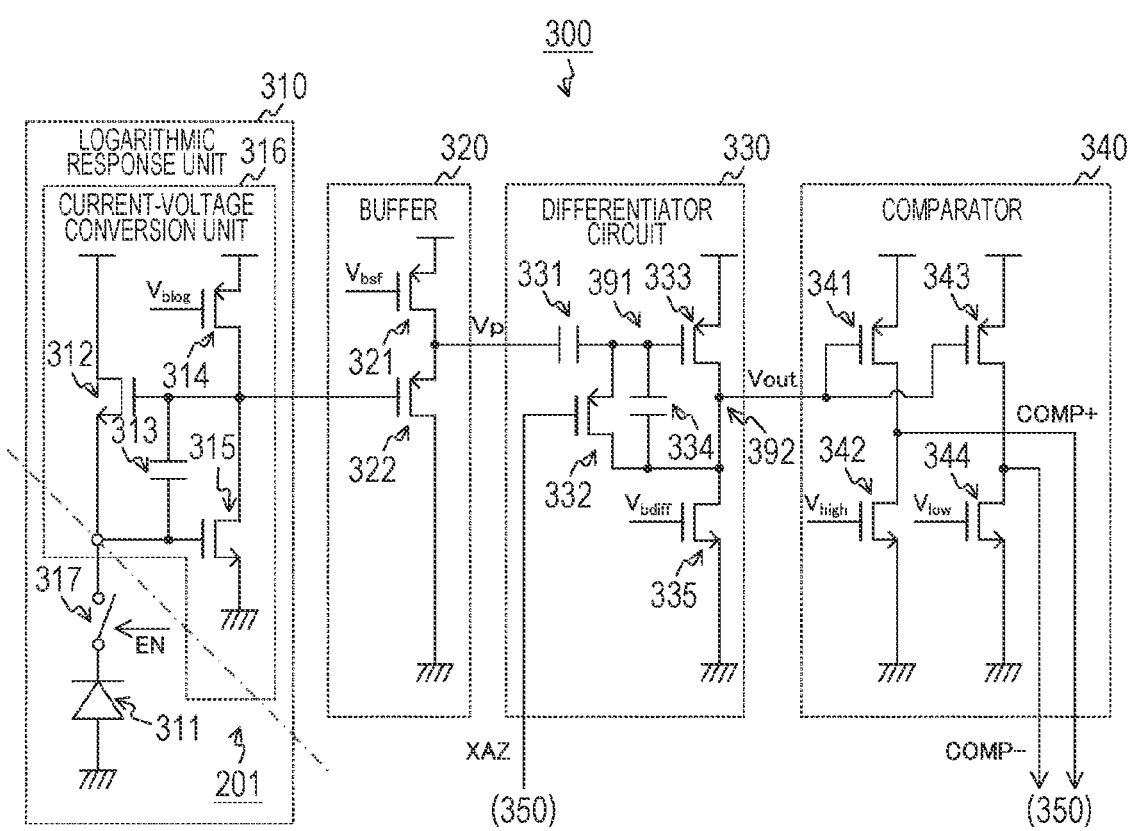
FIG. 5 is a circuit diagram illustrating a configuration example of a logarithmic response unit, a buffer, a differentiator circuit, and a comparator according to the first embodiment of the present technology.

FIG. 5 is a circuit diagram illustrating a configuration example of the logarithmic response unit 310, the buffer 320, the differentiator circuit 330, and the comparator 340 according to the first embodiment of the present technology.

The logarithmic response unit 310 includes a photoelectric conversion element 311, a switch 317, and a current-voltage conversion unit 316. The photoelectric conversion element 311 generates a photocurrent by photoelectric conversion for incident light.

The switch 317 opens or closes a path between the photoelectric conversion element 311 and the current-voltage conversion unit 316 according to enable information EN from the setting information holding unit 240. This switch 317 transitions to a close state in the case of being set to be enabled by the enable information EN and transitions to an open state in the case of being set to be disabled by the enable information EN. For example, a metal-oxide-semiconductor (MOS) transistor is used as the switch 317.

The current-voltage conversion unit 316 logarithmically converts the photocurrent into a pixel voltage Vp. The current-voltage conversion unit 316 includes N-type transistors 312 and 315, a capacitance 313, and a P-type transistor 314. As the N-type transistor 312, the P-type transistor 314, and the N-type transistor 315, a MOS transistor is used, for example.

A source of the N-type transistor 312 is connected to the switch 317 and a drain of the N-type transistor 312 is connected to the power supply terminal. The P-type transistor 314 and the N-type transistor 315 are connected in series between the power supply terminal and a reference terminal having a predetermined reference potential (ground potential or the like). Furthermore, a connection point between the P-type transistor 314 and the N-type transistor 315 is connected to a gate of the N-type transistor 312 and an input terminal of the buffer 320. A connection point between the N-type transistor 312 and the photoelectric conversion element 311 is connected to a gate of the N-type transistor 315. In this way, the N-type transistors 312 and 315 are connected in a loop manner. Note that the circuit including the N-type transistors 312 and 315 connected in a loop manner is an example of a loop circuit described in the claims.

Furthermore, a predetermined bias voltage $V_{blog}$ is applied to a gate of the P-type transistor 314. The capacitance 313 is inserted between the gate of the N-type transistor 312 and the gate of the N-type transistor 315.

Furthermore, for example, the photoelectric conversion element 311 and the switch 317 are arranged on the light-receiving chip 201, and a rear-stage circuit is arranged on the circuit chip 202. Note that the circuits and elements arranged on the light-receiving chip 201 and the circuit chip 202 are not limited to this configuration.

The buffer 320 includes P-type transistors 321 and 322. For example, a MOS transistor is used as the transistors.

In the buffer 320, the P-type transistors 321 and 322 are connected in series between the power supply terminal and the reference potential terminal. Furthermore, a gate of the P-type transistor 322 is connected to the logarithmic response unit 310, and a connection point of the P-type transistors 321 and 322 is connected to the differentiator circuit 330. A predetermined bias voltage $V_{bsf}$ is applied to a gate of the P-type transistor 321.

The differentiator circuit 330 includes capacitances 331 and 334, P-type transistors 332 and 333, and an N-type transistor 335. For example, MOS transistors are used as transistors in the differentiator circuit 330.

The P-type transistor 333 and the N-type transistor 335 are connected in series between the power supply terminal and the reference potential terminal. A predetermined bias voltage $V_{bdiff}$ is input to a gate of the N-type transistor 335. These transistors function as an inverting circuit having the gate of the P-type transistor 333 as an input terminal 391 and the connection point of the P-type transistor 333 and the N-type transistor 335 as an output terminal 392.

The capacitance 331 is inserted between the buffer 320 and the input terminal 391. The capacitance 331 supplies to a current according to time derivative of (in other words, the change amount in) the pixel voltage Vp from the buffer 320 to the input terminal 391. Furthermore, the capacitance 334 is inserted between the input terminal 391 and the output terminal 392.

The P-type transistor 332 opens or closes a path between the input terminal 391 and the output terminal 392 according to the auto-zero signal XAZ from the transfer unit 350. For example, when the low-level auto-zero signal XAZ is input, the P-type transistor 332 transitions to the on state according to the auto-zero signal XAZ and sets the differential signal Vout to the initial value.

The comparator 340 includes P-type transistors 341 and 343 and N-type transistors 342 and 344. For example, a MOS transistor is used as the transistors.

In the comparator 340, the P-type transistor 341 and the N-type transistor 342 are connected in series between the power supply terminal and the reference terminal, and the P-type transistor 343 and the N-type transistor 344 are also connected in series between the power supply terminal and the reference terminal. Furthermore, gates of the P-type transistors 341 and 343 are connected to the differentiator circuit 330. An upper limit voltage $V_{high}$ indicating an upper limit threshold is applied to a gate of the N-type transistor 342, and a lower limit voltage $V_{low}$ indicating a lower limit threshold is applied to a gate of the N-type transistor 344.

A connection point of the P-type transistor 341 and the N-type transistor 342 is connected to the transfer unit 350, and a voltage at this connection point is output as a comparison result COMP+ with respect to the upper limit threshold. A connection point of the P-type transistor 343 and the N-type transistor 344 is also connected to the transfer unit 350, and a voltage at this connection point is output as a comparison result COMP− with respect to the lower limit threshold. With such a connection, the comparator 340 outputs the high-level comparison result COMP+ in a case where the differential signal Vout is higher than the upper limit voltage $V_{high}$, and outputs the low-level comparison result COMP− in a case where the differential signal Vout is lower than the lower limit voltage $V_{low}$. The comparison result COMP is a signal including these comparison results COMP+ and COMP−.

As described above, the switch 317 transitions to the close state in the case of being set to be enabled by the enable information EN. Thereby, the address event detection processing is executed. Meanwhile, the switch 317 transitions to the open state in the case of being set to be disabled by the enable information EN. In this state, the photoelectric conversion element 311 is cut off from the rear-stage circuit and the detection processing is not executed. Then, the detection signal is fixed to the specific value indicating that the address event does not occur (in other words, the change amount of the incident light amount does not exceed the threshold).

Note that the switch 317 is inserted between the photoelectric conversion element 311 and the current-voltage conversion unit 316, but the insertion position of the switch 317 is not limited to this position. As will be described below, the switch 317 can be inserted into a path after the current-voltage conversion unit 316.

Furthermore, the comparator 340 compares both the upper limit threshold and the lower limit threshold with the differential signal Vout. However, the comparator 340 may compare only one of the upper limit threshold and the lower limit threshold with the differential signal Vout. In this case, unnecessary transistors can be eliminated. For example, when comparing the differential signal Vout only with the upper limit threshold, only the P-type transistor 341 and the N-type transistor 342 are arranged.

Figure 6:
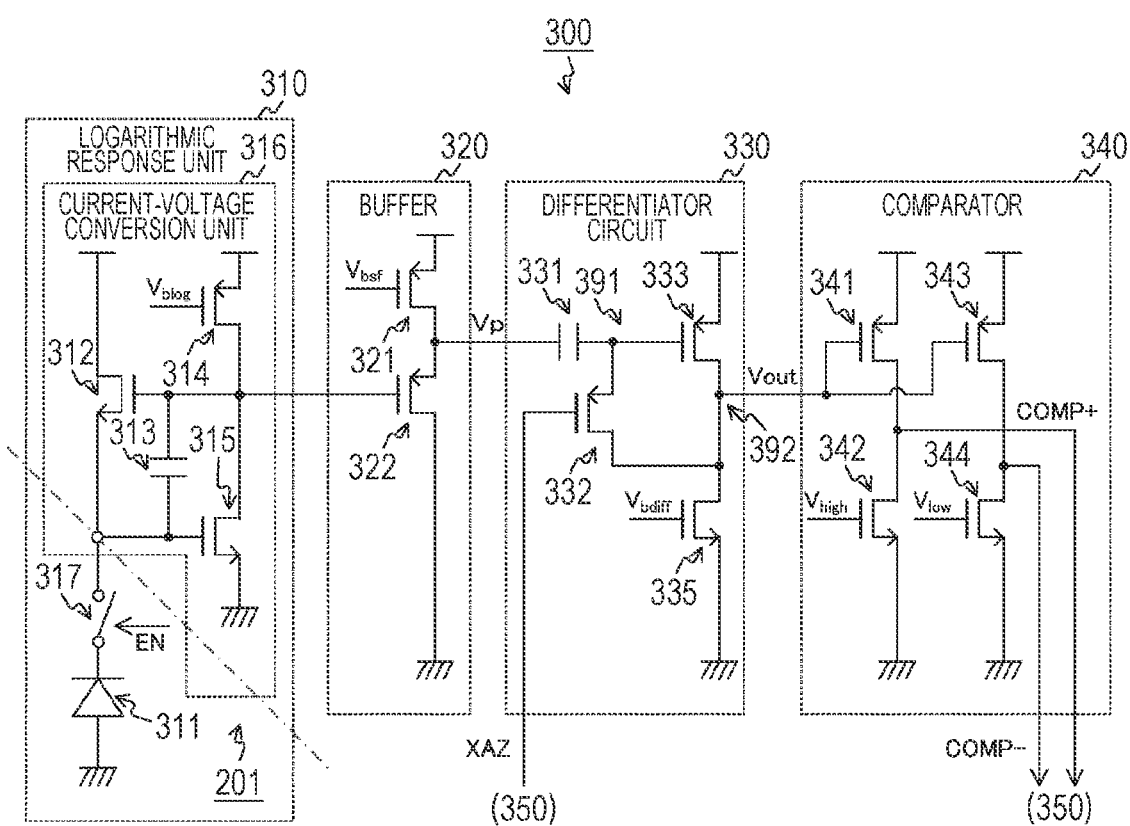
FIG. 6 is a circuit diagram illustrating a configuration example of a logarithmic response unit with a reduced capacitance, a buffer, a differentiator circuit, and a comparator according to the first embodiment of the present technology.

Furthermore, the capacitance 334 is arranged in the differentiator circuit 330, but the capacitance 334 can be reduced as illustrated in FIG. 6.

[Configuration Example of Signal Processing Unit]

Figure 7:
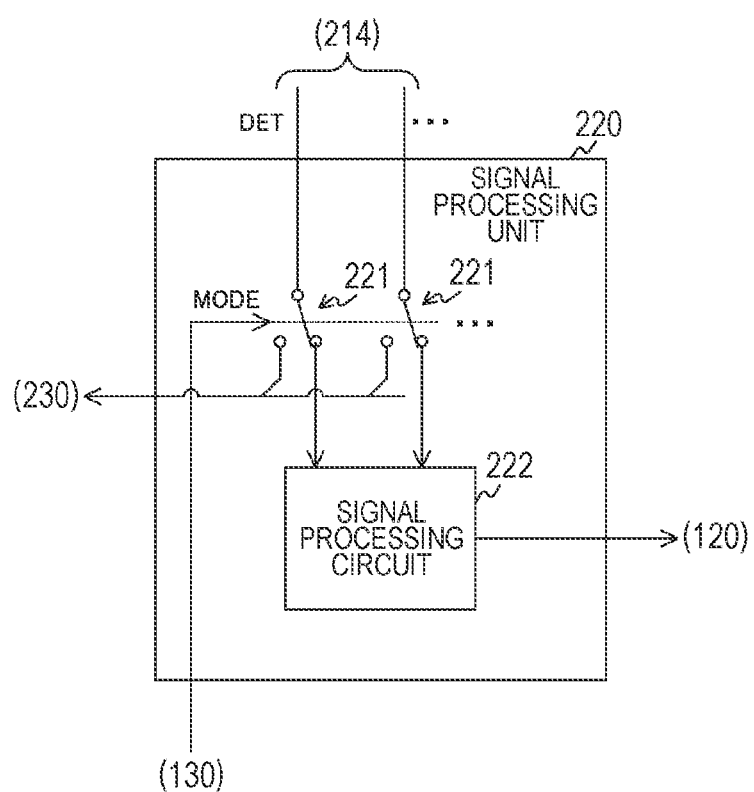
FIG. 7 is a block diagram illustrating a configuration example of a signal processing unit according to the first embodiment of the present technology.

FIG. 7 is a block diagram illustrating a configuration example of the signal processing unit 220 according to the first embodiment of the present technology. The signal processing unit 220 includes a selector 221 provided for each column and a signal processing circuit 222.

The selector 221 switches an output destination of the detection signal DET from a corresponding column in the pixel array unit 214 according to the mode signal MODE. The selector 221 outputs the detection signal DET to the signal processing circuit 222 in the detection mode, and outputs the detection signal DET to the abnormal pixel determination unit 230 in the abnormality determination mode.

The signal processing circuit 222 performs predetermined signal processing for the detection signal DET and outputs processed data to the recording unit 120.

[Configuration Example of Abnormal Pixel Determination Unit]

Figure 8:
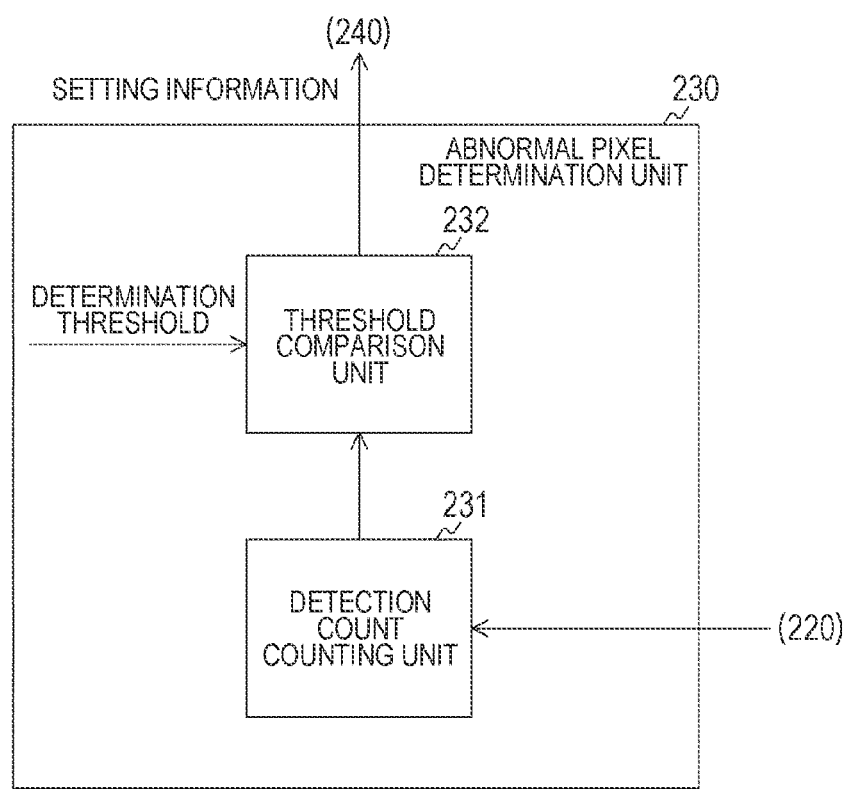
FIG. 8 is a block diagram illustrating a configuration example of an abnormal pixel determination unit according to the first embodiment of the present technology.

FIG. 8 is a block diagram illustrating a configuration example of the abnormal pixel determination unit 230 according to the first embodiment of the present technology. The abnormal pixel determination unit 230 includes a detection count counting unit 231 and a threshold comparison unit 232.

The detection count counting unit 231 counts the number of times an address event has been detected for each pixel in the abnormality determination mode. In the abnormality determination mode, the solid-state image sensor 200 detects the presence or absence of an address event for each pixel for a certain period of time in a state where the incident light amount has no change (for example, in a shaded state). The detection count counting unit 231 counts the number of times within this period and supplies a detection count for each pixel to the threshold comparison unit 232.

The threshold comparison unit 232 compares the corresponding detection count with a predetermined determination threshold for each pixel. As described above, since an address event is supposed not to occur in the state where the incident light amount has no change, a pixel in which the detection count of an address event exceeds the determination threshold in this state can be determined to be abnormal. The threshold comparison unit 232 determines whether or not the detection count exceeds the determination threshold (that is, presence or absence of abnormality) for each pixel, and causes the setting information holding unit 240 to hold information indicating a determination result for each pixel as the setting information.

Figure 9:
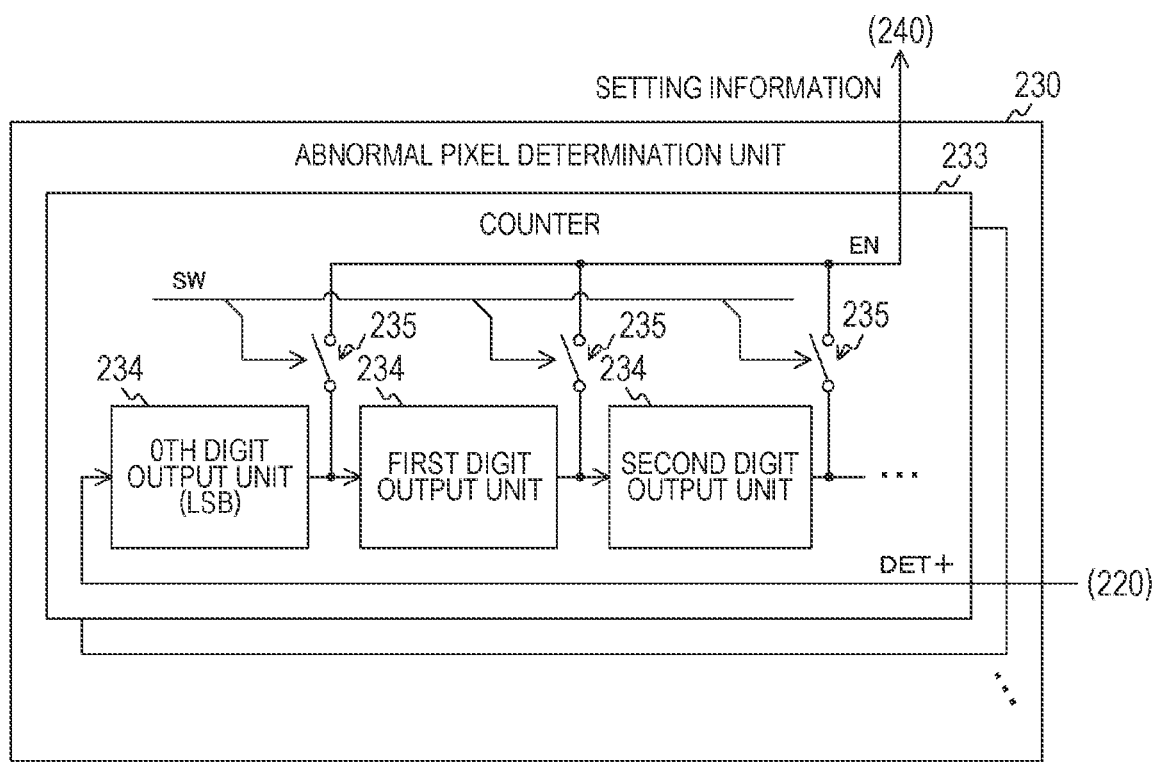
FIG. 9 is a block diagram illustrating a configuration example of an abnormal pixel determination unit using a counter according to the first embodiment of the present technology.

Note that the detection count counting unit 231 and the threshold comparison unit 232 are provided in the abnormal pixel determination unit 230. However, a plurality of counters 233 may be arranged instead of the detection count counting unit 231 and the threshold comparison unit 232. In this case, for example, as illustrated in FIG. 9, an N-bit (N is an integer) counter 233 is arranged for each pixel. In the counter 233, N-stage n-th digit output units 234 that each output the n-th (n is an integer from 0 to N−1) digit and N switches 235 are arranged. The detection signal DET+ of a corresponding pixel is input to the n-th digit output unit 234 of the lowest digit. FIG. 9 assumes a case of detecting only on-events. Furthermore, the N switches 235 do not output any N digits at the start of the abnormality determination mode, and output any of the N digits as the enable information EN of the pixel to the setting information holding unit 240 according to the control signal SW when a certain time elapses. The n-th digit becomes at a high level when a count value becomes $2^n$ in the case of a binary counter. When the switch 235 outputs the n-th digit, $2^n$ corresponds to the threshold.

[Operation Example of Solid-State Image Sensor]

Figure 10:
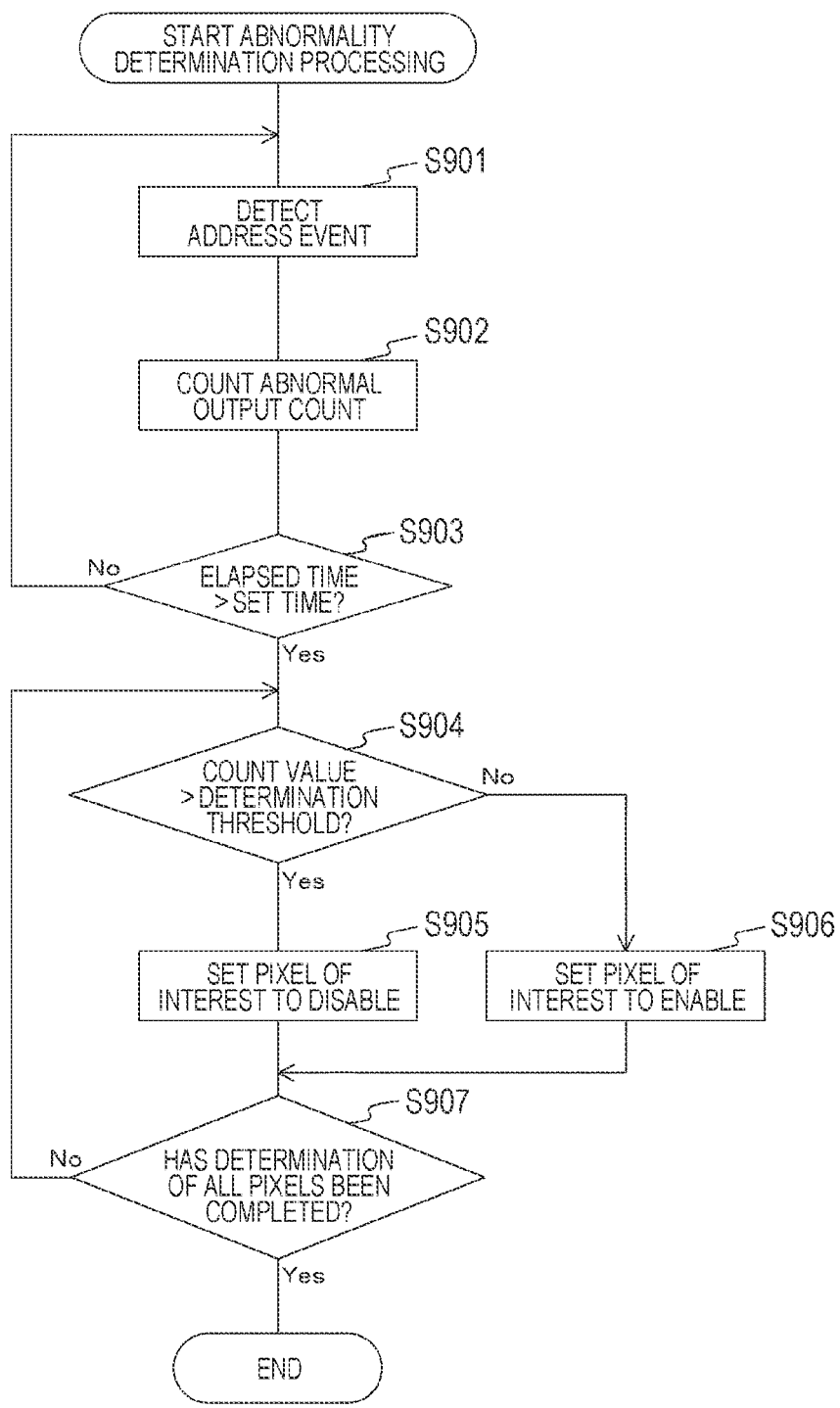
FIG. 10 is a flowchart illustrating an example of abnormality determination processing according to the first embodiment of the present technology.

FIG. 10 is a flowchart illustrating an example of the abnormality determination processing according to the first embodiment of the present technology. The abnormality determination processing is started when the mode signal MODE indicating the abnormality determination mode is input.

In the abnormality determination mode, each of the pixels 300 detects the presence or absence of an address event (step S901), and the abnormal pixel determination unit 230 counts the detection count of the address event for each pixel (step S902). Then, the solid-state image sensor 200 determines whether or not an elapsed time from the time when the detection of an address event is started becomes longer than a predetermined set time (step S903). In a case where the elapsed time is equal to or less than the set time (step S903: No), the solid-state image sensor 200 repeatedly executes step S901 and the subsequent steps.

On the other hand, in a case where the elapsed time is longer than the predetermined set time (step S903: Yes), the abnormal pixel determination unit 230 focuses on a certain pixel and determines whether or not the count value of the pixel exceeds the determination threshold (that is, whether or not the pixel is abnormal) (step S904). In a case where the count value exceeds the determination threshold (step S904: Yes), the abnormal pixel determination unit 230 sets the pixel of interest to be disable in the setting information (step S905).

On the other hand, in a case where the count value is equal to or smaller than the determination threshold (step S904: No), the abnormal pixel determination unit 230 sets the pixel of interest to be enable in the setting information (step S906). After step S905 or S906, the abnormal pixel determination unit 230 determines whether or not the determination of the presence or absence of abnormality has been completed for all the pixels (step S907). In a case where the determination for all the pixels has not been completed (step S907: No), the abnormal pixel determination unit 230 repeats step S904 and the subsequent steps. On the other hand, in a case where the determination for all the pixels has been completed (step S907: Yes), the abnormal pixel determination unit 230 holds the setting information and terminates the abnormality determination processing.

Figure 11:
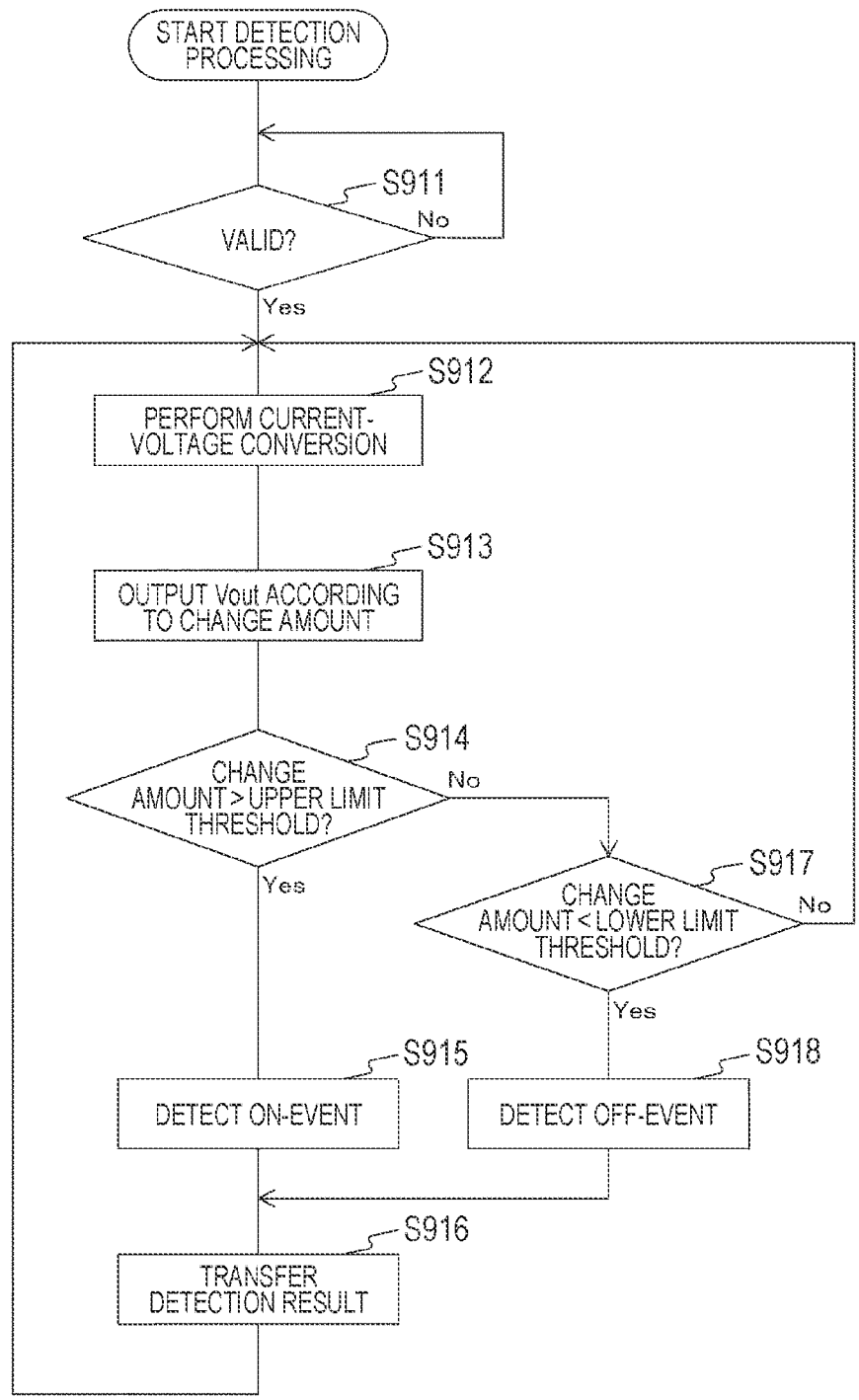
FIG. 11 is a flowchart illustrating an example of detection processing according to the first embodiment of the present technology.

FIG. 11 is a flowchart illustrating an example of detection processing according to the first embodiment of the present technology. The detection processing is started when the mode signal MODE indicating the detection mode is input.

The switch 317 in the pixel 300 determines whether or not the enable information EN is enabled (step S911). In a case where the enable information EN is disabled (step S911: No), the switch 317 transitions to the open state and repeats step S911 and the subsequent steps.

On the other hand, in a case where the enable information EN is enabled (step S911: Yes), the switch 317 transitions to the close state, and the logarithmic response unit 310 converts the photocurrent into the pixel voltage (step S912). The differentiator circuit 330 outputs an output voltage Vout according to a change amount in brightness (step S913). The comparator 340 compares the output voltage Vout with an upper limit threshold and determines whether or not the change amount in brightness exceeds the upper limit threshold (step S914).

In a case where the change amount exceeds the upper limit threshold (step S914: Yes), the comparator 340 detects an on-event (step S915). On the other hand, in a case where the change amount is equal to or less than the upper limit threshold (step S914: No), the comparator 340 compares the differential signal Vout with the lower limit threshold and determines whether or not the change amount in brightness falls below the lower limit threshold (step S917).

In a case where the change amount falls below the lower limit threshold (step S917: Yes), the comparator 340 detects an off-event (step S918). On the other hand, in a case where the change amount is equal to or larger than the lower limit threshold (step S917: No), the pixel 300 repeats step S912 and the subsequent steps.

After step S915 or S918, the transfer unit 350 transfers the detection result (step S916) and repeatedly executes step S912 and the subsequent steps.

In a synchronous solid-state image sensor that captures an image in synchronization with a vertical synchronous signal or the like, an output of an abnormal pixel such as a blinking point or a white spot is the same amount as that of a normal pixel, and there is no particular effect on readout. However, in a DVS such as the solid-state image sensor 200, when an abnormal pixel detection signal is output, the signal occupies a part of an output interface band and is output mixed with a normal pixel detection signal. Furthermore, the detection signal of an abnormal pixel (in other words, noise) increases the power consumption of the solid-state image sensor 200, and the increase in noise lowers the recognition accuracy in the processing such as image recognition.

Assuming that the number of pixels is 1280×720 pixels (that is, 0.9 megapixels) and 0.5% of the number of pixels are abnormal pixels, the abnormal pixels are 4600 pixels. In addition, it is assumed that the abnormal pixel blinks twice on average in one second, and one blinking causes ten address events. In this case, the band for 92000 events per second is wasted. Furthermore, assuming that the power consumption when one address event occurs is 0.17 nanowatts (nW), the power consumption by the abnormal pixel is 0.016 milliwatts (mW). Assuming that the power consumption when one address event occurs is 270 nanowatts (nW), the power consumption by the abnormal pixel is 24.8 milliwatts (mW).

In contrast, the above-described solid-state image sensor 200 sets abnormal pixels to be disabled to suppress erroneous detection of address events, thereby reducing the power consumption and widening the band for transferring the detection signals of normal pixels.

As described above, according to the first embodiment of the present technology, since the value of the detection signal of the abnormal pixel is fixed to a specific value indicating that an address event does not occur, erroneous detection of the address event by the abnormal pixel can be suppressed.

First Modification

In the above-described first embodiment, the photoelectric conversion element 311 and the switch 317 have been provided on the light-receiving chip 201, but in this configuration, the circuit scale of the circuit chip 202 increases as the number of pixels increases. The solid-state image sensor 200 of a first modification of the first embodiment is different from that of the first embodiment in that a part of the circuit of the current-voltage conversion unit 316 and the subsequent elements is further provided on the light-receiving chip 201.

Figure 12:
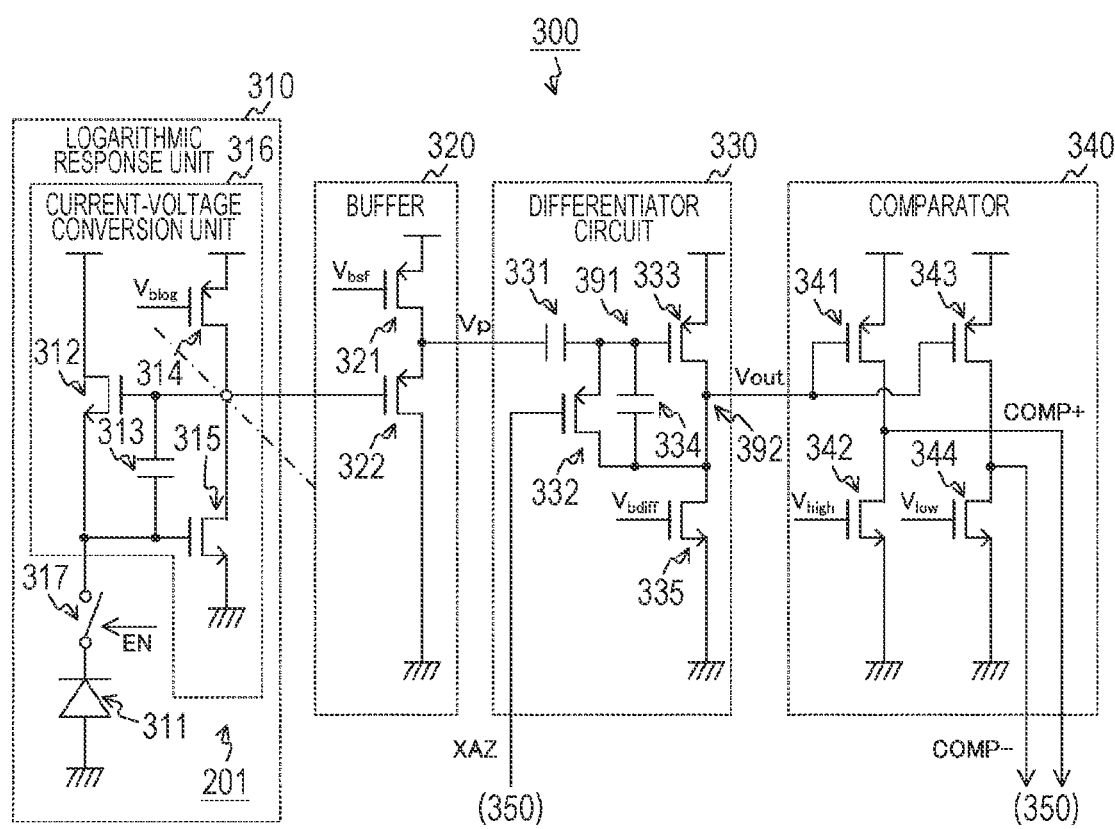
FIG. 12 is a circuit diagram illustrating a configuration example of the logarithmic response unit, the buffer, the differentiator circuit, and the comparator according to a first modification of the first embodiment of the present technology.

FIG. 12 is a circuit diagram illustrating a configuration example of the logarithmic response unit 310, the buffer 320, the differentiator circuit 330, and the comparator 340 according to the first modification of the first embodiment of the present technology. The pixel 300 of the first modification of the first embodiment is different from that of the first embodiment in that the N-type transistors 312 and 315 and the capacitance 313 are further provided on the light-receiving chip 201. In the case where an N-type MOS transistor is used as the switch 317, the transistors in the light-receiving chip 201 can be limited to the N-type transistors. Thereby, the number of steps for forming the transistors can be reduced as compared with the case where N-type transistors and P-type transistors are mixed, and the manufacturing cost of the light-receiving chip 201 can be reduced.

As described above, according to the first modification of the first embodiment of the present technology, the N-type transistors 312 and 315 and the capacitance 313 are further provided on the light-receiving chip 201. Therefore, the circuit scale of the circuit chip 202 can be reduced.

Second Modification

In the above-described first embodiment, the photoelectric conversion element 311 and the switch 317 have been provided on the light-receiving chip 201, but in this configuration, the circuit scale of the circuit chip 202 increases as the number of pixels increases. The solid-state image sensor 200 of a second modification of the first embodiment is different from that of the first embodiment in that a part of the circuit of the current-voltage conversion unit 316 and the subsequent elements is further provided on the light-receiving chip 201.

Figure 13:
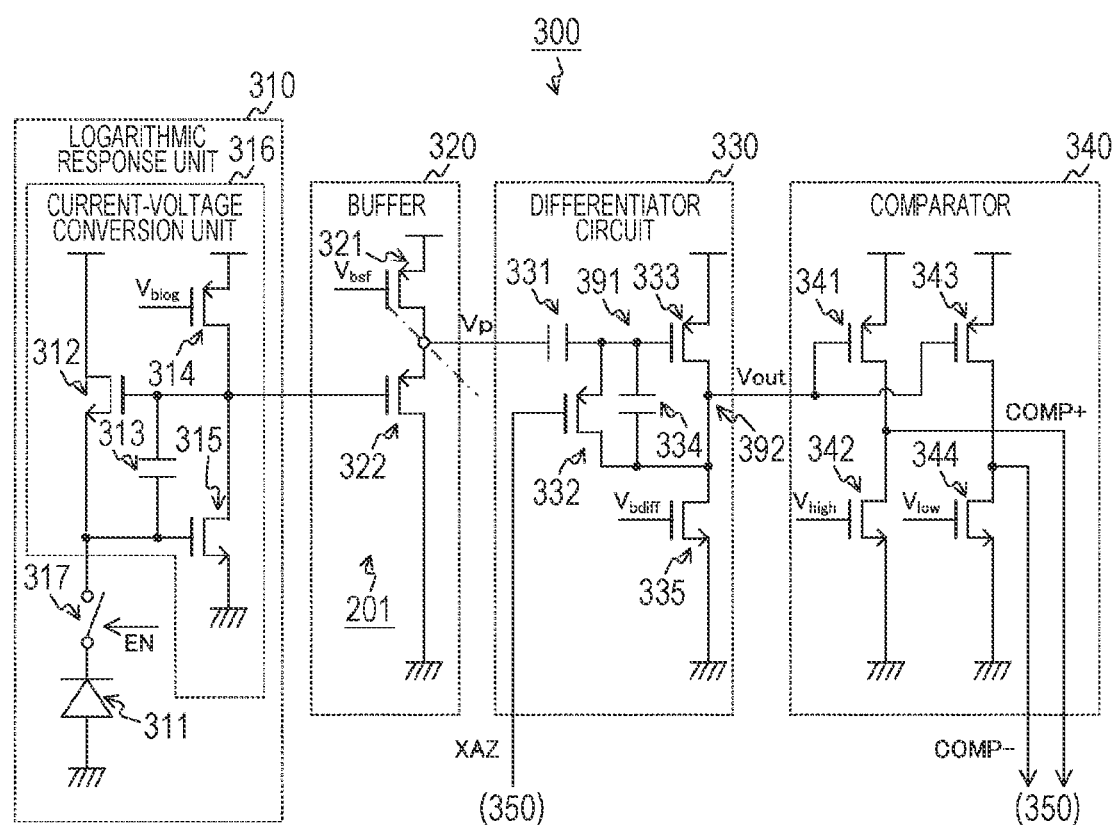
FIG. 13 is a circuit diagram illustrating a configuration example of the logarithmic response unit, the buffer, the differentiator circuit, and the comparator according to a second modification of the first embodiment of the present technology.

FIG. 13 is a circuit diagram illustrating a configuration example of the logarithmic response unit 310, the buffer 320, the differentiator circuit 330, and the comparator 340 according to the second modification of the first embodiment of the present technology. The pixel 300 of the second modification of the first embodiment is different from that of the first embodiment in that the current-voltage conversion unit 316 and the P-type transistor 322 in the buffer 320 are further provided on the light-receiving chip 201.

As described above, according to the second modification of the first embodiment of the present technology, the current-voltage conversion unit 316 and the P-type transistor 322 in the buffer 320 are further provided on the light-receiving chip 201. Therefore, the circuit scale of the circuit chip 202 can be reduced.

Third Modification

In the above-described first embodiment, the photoelectric conversion element 311 and the switch 317 have been provided on the light-receiving chip 201, but in this configuration, the circuit scale of the circuit chip 202 increases as the number of pixels increases. The solid-state image sensor 200 of a third modification of the first embodiment is different from that of the first embodiment in that a part of the circuit of the current-voltage conversion unit 316 and the subsequent elements is further provided on the light-receiving chip 201.

Figure 14:
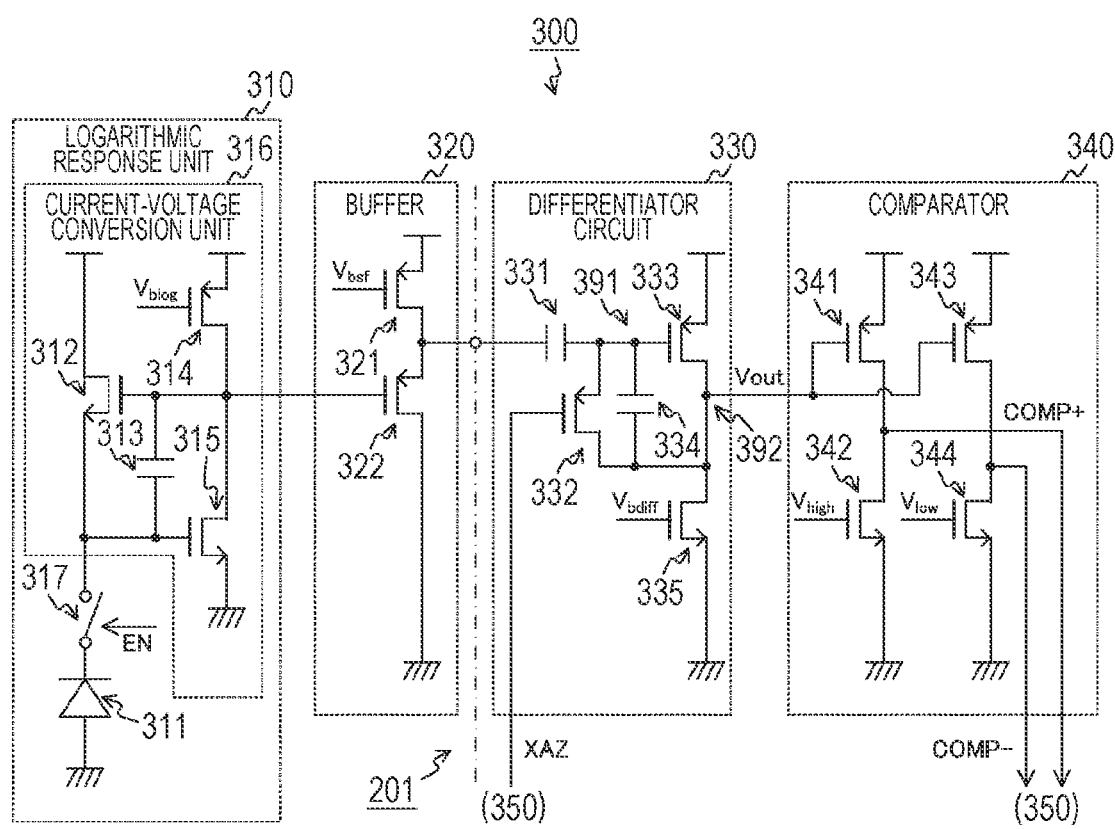
FIG. 14 is a circuit diagram illustrating a configuration example of the logarithmic response unit, the buffer, the differentiator circuit, and the comparator according to a third modification of the first embodiment of the present technology.

FIG. 14 is a circuit diagram illustrating a configuration example of the logarithmic response unit 310, the buffer 320, the differentiator circuit 330, and the comparator 340 according to the third modification of the first embodiment of the present technology. The pixel 300 of the third modification of the first embodiment is different from that of the first embodiment in that the current-voltage conversion unit 316 and the buffer 320 are further provided on the light-receiving chip 201.

As described above, according to the third modification of the first embodiment of the present technology, the current-voltage conversion unit 316 and the buffer 320 are further provided on the light-receiving chip 201. Therefore, the circuit scale of the circuit chip 202 can be reduced.

Fourth Modification

In the above-described first embodiment, the photoelectric conversion element 311 and the switch 317 have been provided on the light-receiving chip 201, but in this configuration, the circuit scale of the circuit chip 202 increases as the number of pixels increases. The solid-state image sensor 200 of a fourth modification of the first embodiment is different from that of the first embodiment in that a part of the circuit of the current-voltage conversion unit 316 and the subsequent elements is further provided on the light-receiving chip 201.

Figure 15:
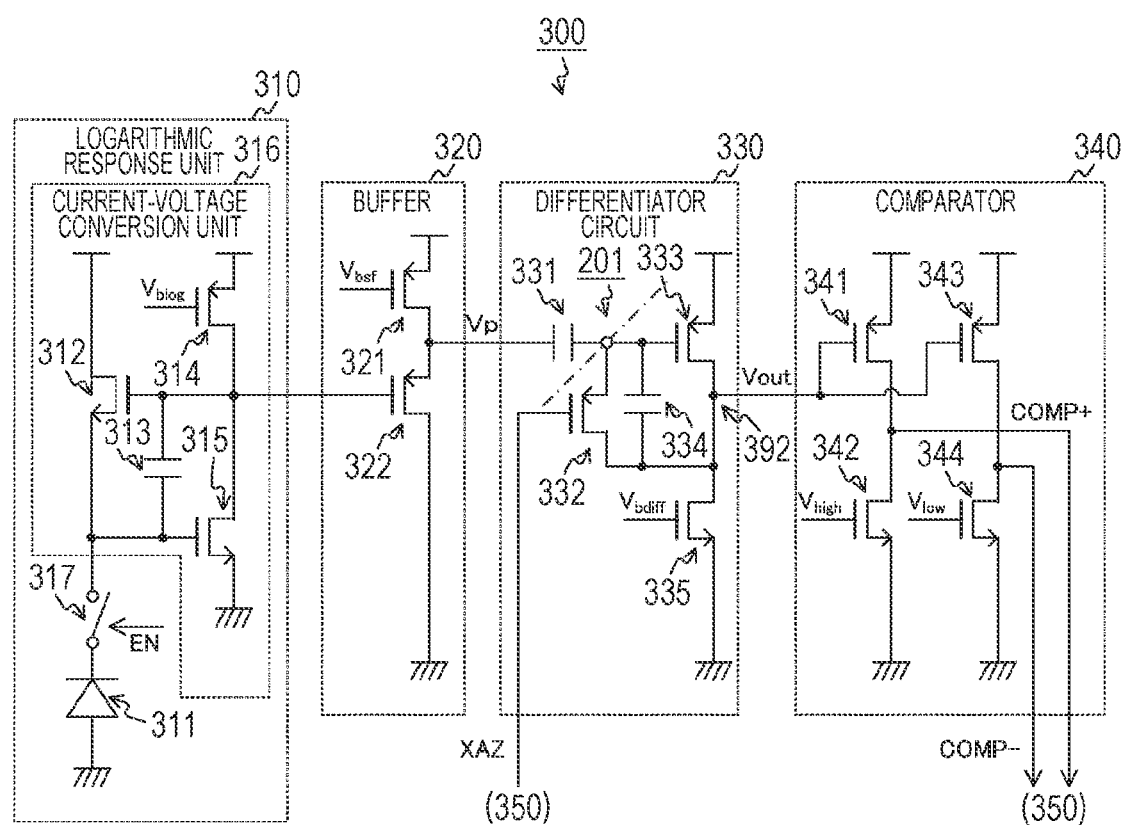
FIG. 15 is a circuit diagram illustrating a configuration example of the logarithmic response unit, the buffer, the differentiator circuit, and the comparator according to a fourth modification of the first embodiment of the present technology.

FIG. 15 is a circuit diagram illustrating a configuration example of the logarithmic response unit 310, the buffer 320, the differentiator circuit 330, and the comparator 340 according to a fourth modification of the first embodiment of the present technology. The pixel 300 of the fourth modification of the first embodiment is different from that of the first embodiment in that the current-voltage conversion unit 316 and the buffer 320, and the capacitance 331 in the differentiator circuit 330 are further provided on the light-receiving chip 201.

As described above, according to the fourth modification of the first embodiment of the present technology, the current-voltage conversion unit 316 and the buffer 320, and the capacitance 331 are further provided on the light-receiving chip 201. Therefore, the circuit scale of the circuit chip 202 can be reduced.

Fifth Modification

In the above-described first embodiment, the photoelectric conversion element 311 and the switch 317 have been provided on the light-receiving chip 201, but in this configuration, the circuit scale of the circuit chip 202 increases as the number of pixels increases. The solid-state image sensor 200 of a fifth modification of the first embodiment is different from that of the first embodiment in that a part of the circuit of the current-voltage conversion unit 316 and the subsequent elements is further provided on the light-receiving chip 201.

Figure 16:
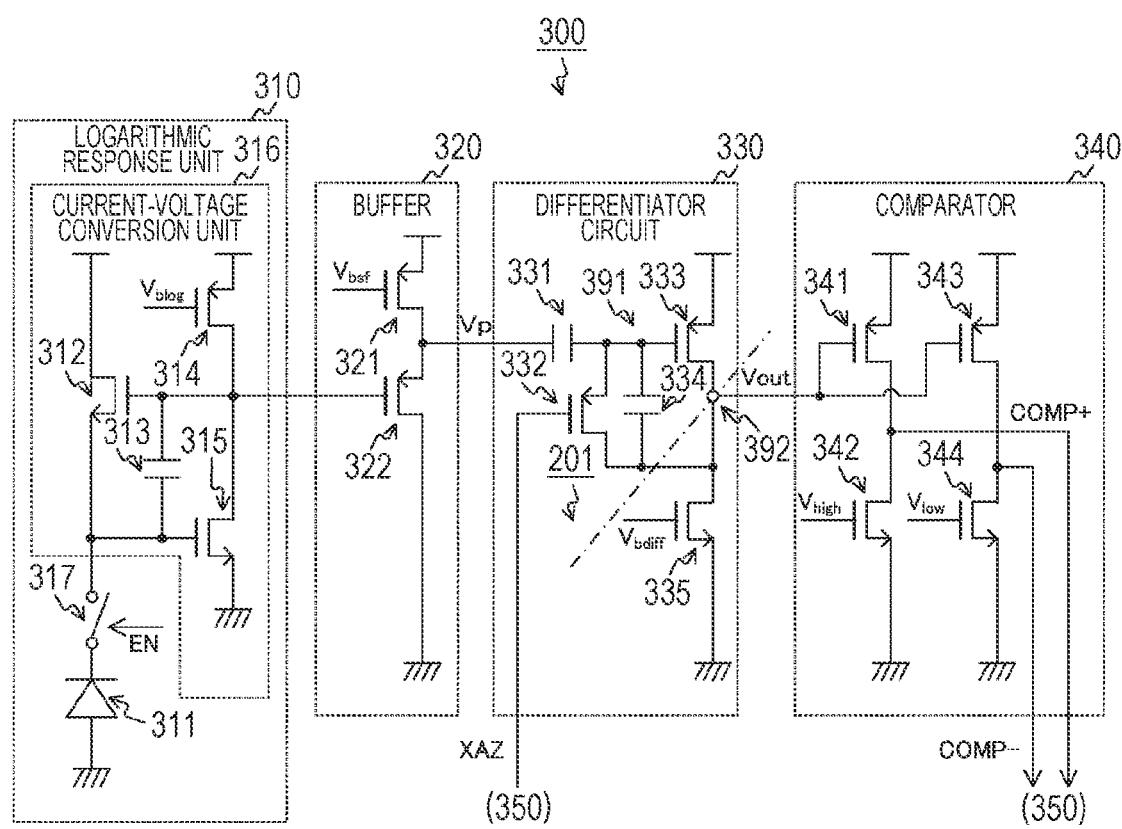
FIG. 16 is a circuit diagram illustrating a configuration example of the logarithmic response unit, the buffer, the differentiator circuit, and the comparator according to a fifth modification of the first embodiment of the present technology.

FIG. 16 is a circuit diagram illustrating a configuration example of the logarithmic response unit 310, the buffer 320, the differentiator circuit 330, and the comparator 340 according to the fifth modification of the first embodiment of the present technology. The pixel 300 of the fifth modification of the first embodiment is different from that of the first embodiment in that the current-voltage conversion unit 316 and the buffer 320, and the elements other than the N-type transistor 335 in the differentiator circuit 330 are further provided on the light-receiving chip 201.

As described above, according to the fifth modification of the first embodiment of the present technology, the current-voltage conversion unit 316 and the buffer 320, and a part of the differentiator circuit 330 are further provided on the light-receiving chip 201. Therefore, the circuit scale of the circuit chip 202 can be reduced.

Sixth Modification

In the above-described first embodiment, the photoelectric conversion element 311 and the switch 317 have been provided on the light-receiving chip 201, but in this configuration, the circuit scale of the circuit chip 202 increases as the number of pixels increases. The solid-state image sensor 200 of a sixth modification of the first embodiment is different from that of the first embodiment in that a part of the circuit of the current-voltage conversion unit 316 and the subsequent elements is further provided on the light-receiving chip 201.

Figure 17:
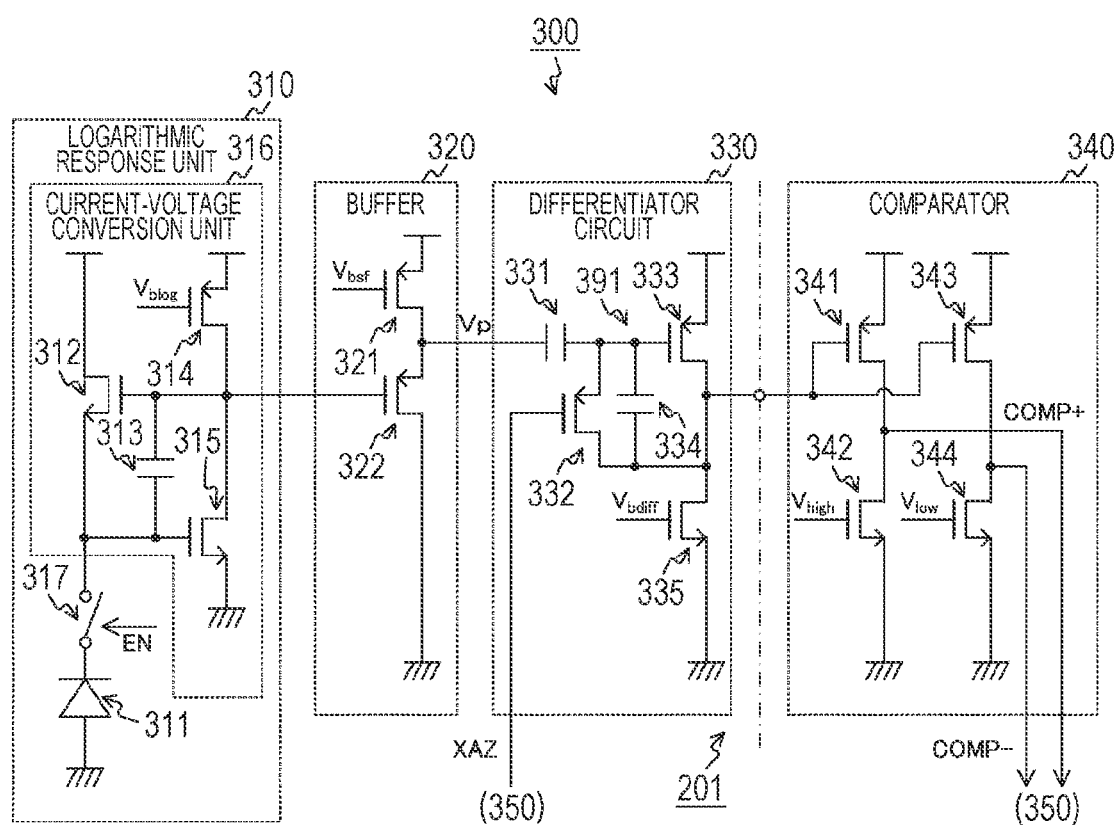
FIG. 17 is a circuit diagram illustrating a configuration example of the logarithmic response unit, the buffer, the differentiator circuit, and the comparator according to a sixth modification of the first embodiment of the present technology.

FIG. 17 is a circuit diagram illustrating a configuration example of the logarithmic response unit 310, the buffer 320, the differentiator circuit 330, and the comparator 340 according to the sixth modification of the first embodiment of the present technology. The pixel 300 of the sixth modification of the first embodiment is different from that of the first embodiment in that the current-voltage conversion unit 316, the buffer 320, and the differentiator circuit 330 are further provided on the light-receiving chip 201.

As described above, according to the third modification of the first embodiment of the present technology, the current-voltage conversion unit 316, the buffer 320, and the differentiator circuit 330 are further provided on the light-receiving chip 201. Therefore, the circuit scale of the circuit chip 202 can be reduced.

2. Second Embodiment

In the above-described first embodiment, the photoelectric conversion element 311 has been cut off from the rear-stage circuit by the switch 317, but there is a possibility that noise occurs in the rear-stage circuit and an address event is erroneously detected. A solid-state image sensor 200 according to a second embodiment is different from that of the first embodiment in that a switch is inserted into a rear-stage circuit of a photoelectric conversion element 311.

Figure 18:
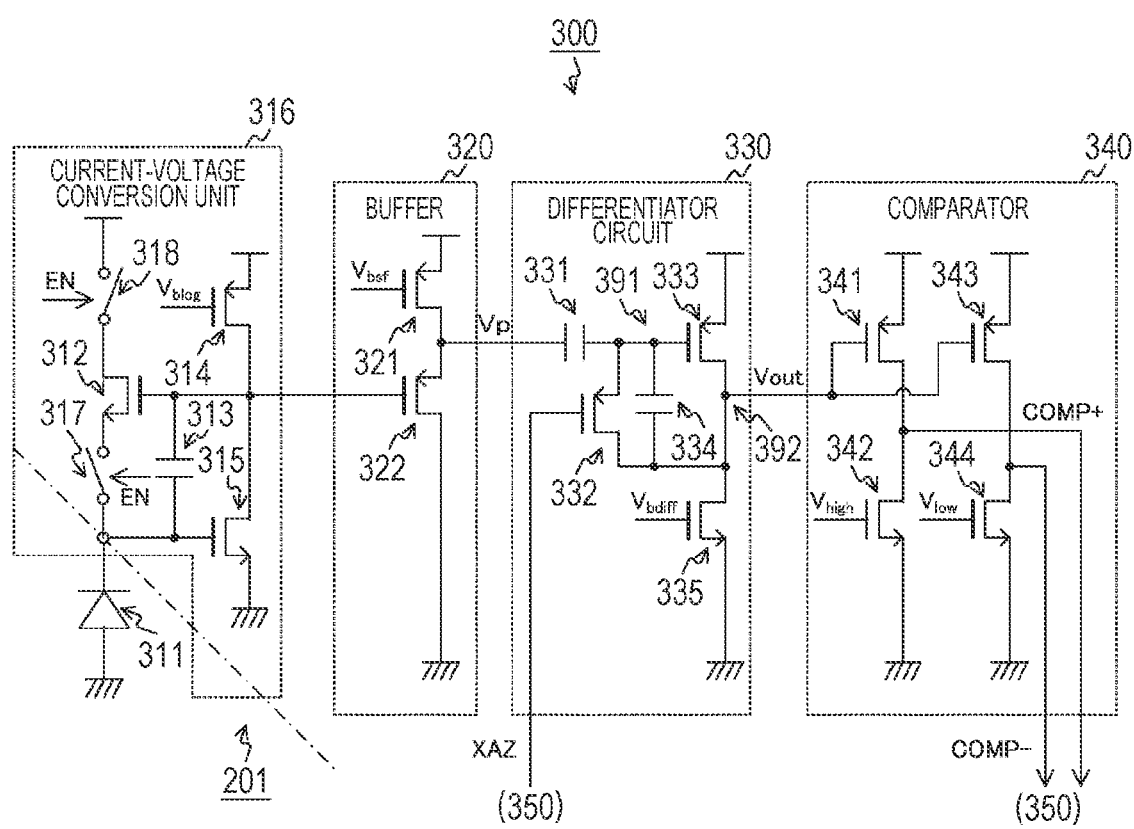
FIG. 18 is a circuit diagram illustrating a configuration example of a logarithmic response unit, a buffer, a differentiator circuit, and a comparator according to a second embodiment of the present technology.

FIG. 18 is a circuit diagram illustrating a configuration example of a logarithmic response unit 310, a buffer 320, a differentiator circuit 330, and a comparator 340 according to the second embodiment of the present technology. A pixel 300 of the second embodiment is different from that of the first embodiment in that a switch 318 is further provided in a current-voltage conversion unit 316. Furthermore, a switch 317 of the second embodiment is inserted in a path between a photoelectric conversion element 311 and an N-type transistor 312 in a loop circuit. The switch 318 is inserted between the N-type transistor 312 and a power supply terminal in the loop circuit. The switch 318 transitions to an open state in a case of being set to be disabled by enable information EN and transitions to a close state in a case of being set to be enabled by the enable information EN. The transition to the open state of the switch 317 or 318 cuts off a current from the power supply, and can reliably suppress erroneous detection of an address event.

Note that each of the first to sixth modifications of the first embodiment can be applied to the solid-state image sensor 200 of the second embodiment. Further, although both the switch 317 and the switch 318 are inserted, only one of them may be arranged. Only the switch 317 may be arranged, or only the switch 318 may be arranged.

As described above, according to the second embodiment of the present technology, since the switch 318 is further inserted between the N-type transistor 312 and the power supply terminal, the current from the power supply is further cut off and erroneous detection of the address event can be more reliably suppressed.

First Modification

In the above-described second embodiment, the current has been cut off by the switches 317 and 318, but there is a possibility that noise occurs in the rear-stage circuit of the buffer 320 or of the subsequent elements and an address event is erroneously detected. The solid-state image sensor 200 according to a first modification of the second embodiment is different from that of the second embodiment in that a switch is inserted to the circuit of the buffer 320 or a subsequent element.

Figure 19:
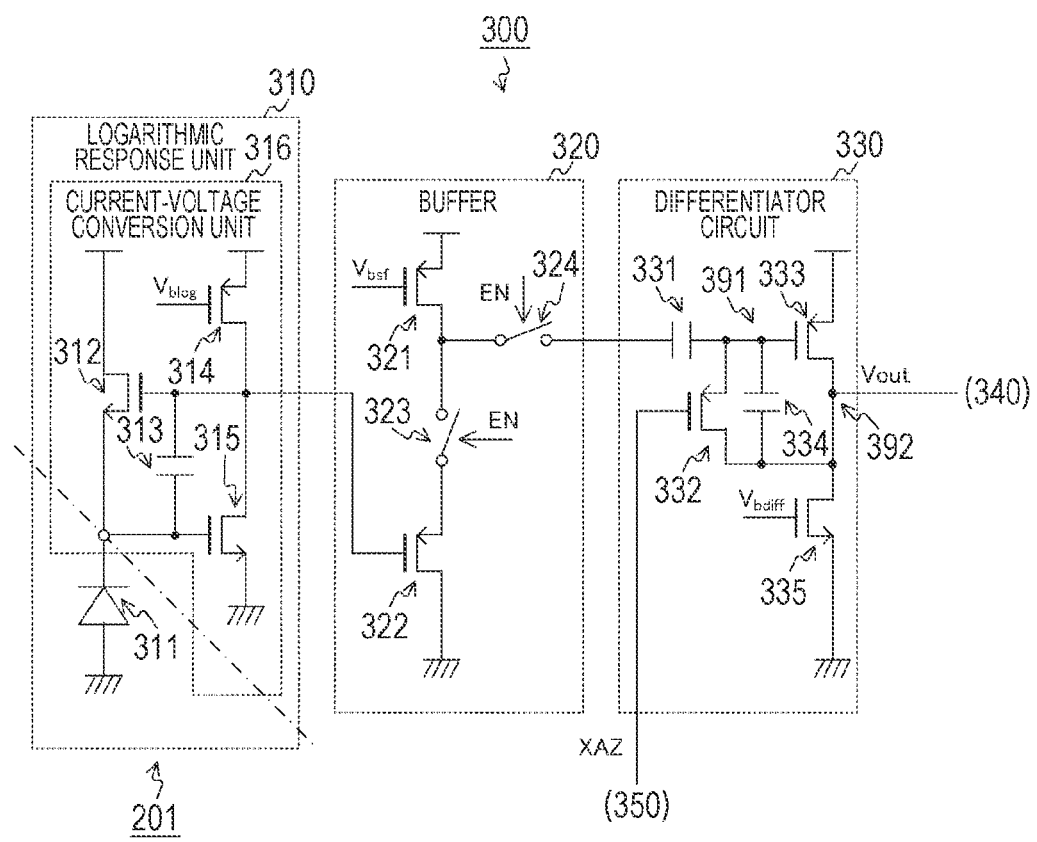
FIG. 19 is a circuit diagram illustrating a configuration example of the logarithmic response unit, the buffer, and the differentiator circuit according to a first modification of the second embodiment of the present technology.

FIG. 19 is a circuit diagram illustrating a configuration example of the logarithmic response unit 310, the buffer 320, and the differentiator circuit 330 according to the first modification of the second embodiment of the present technology. The pixel 300 of the first modification of the second embodiment is different from that of the second embodiment in that switches 323 and 324 are provided instead of the switches 317 and 318.

The switch 323 is inserted between P-type transistors 321 and 322 in the buffer 320. Furthermore, the switch 324 is inserted between a connection point of the P-type transistor 321 and the switch 323 and the differentiator circuit 330. Note that the P-type transistor 321 is an example of a first transistor described in the claims, and the P-type transistor 322 is an example of a second transistor described in the claims.

The switches 323 and 324 transition to an open state in a case of being set to be disabled by enable information EN and transition to a close state in a case of being set to be enabled by the enable information EN. The transitions to the open state of the switches 323 and 324 cut off a pixel voltage Vp from the logarithmic response unit 310 and can suppress erroneous detection of an address event.

Note that both the switches 323 and 324 are arranged, but only one of them can be arranged. Furthermore, each of the first to sixth modifications of the first embodiment can be applied to the solid-state image sensor 200 of the first modification of the second embodiment.

As described above, according to the first modification of the second embodiment of the present technology, since the switches 323 and 324 are provided in the buffer 320, the pixel voltage Vp from the logarithmic response unit 310 in the front stage of the buffer 320 can be cut off. As a result, erroneous detection of an address event can be suppressed.

Second Modification

In the above-described second embodiment, the current has been cut off by the switches 317 and 318, but there is a possibility that noise occurs in the rear-stage circuit of the buffer 320 or of the subsequent elements and an address event is erroneously detected. The solid-state image sensor 200 according to a second modification of the second embodiment is different from that of the second embodiment in that a switch is inserted to the circuit of the buffer 320 or a subsequent element.

Figure 20:
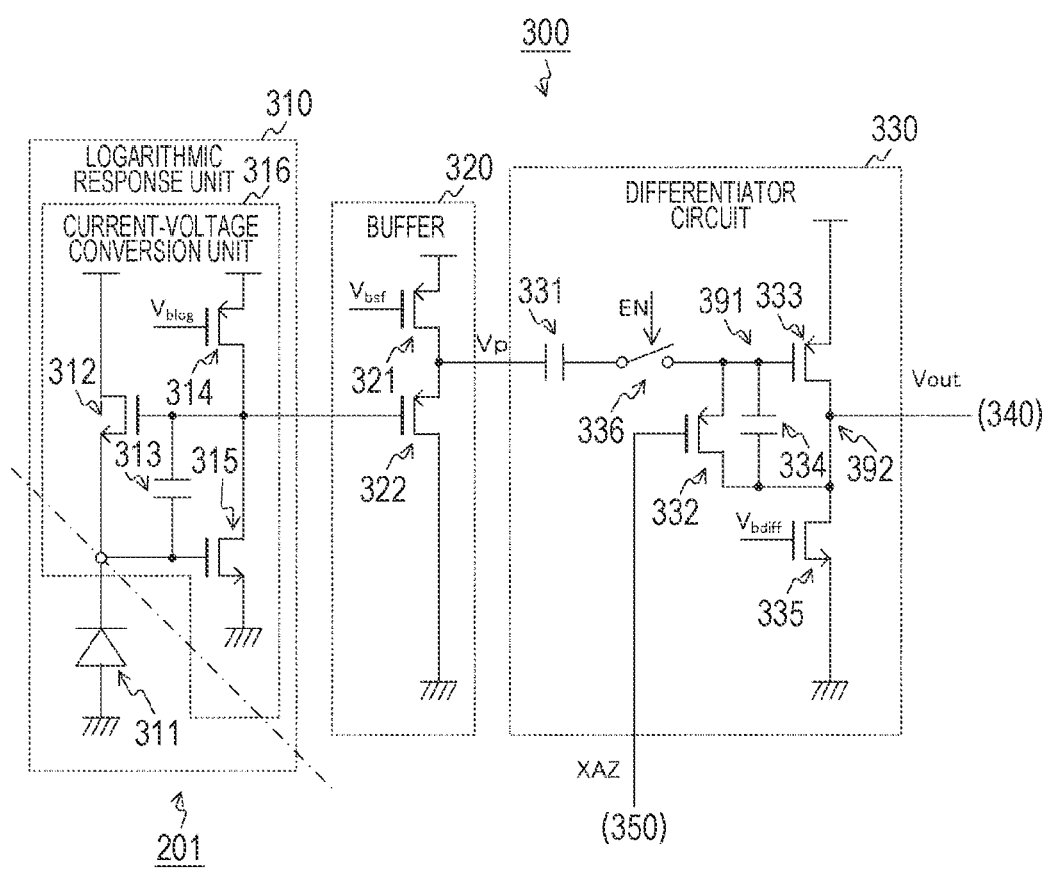
FIG. 20 is a circuit diagram illustrating a configuration example of the logarithmic response unit, the buffer, and the differentiator circuit according to a second modification of the second embodiment of the present technology.

FIG. 20 is a circuit diagram illustrating a configuration example of the logarithmic response unit 310, the buffer 320, and the differentiator circuit 330 according to the second modification of the second embodiment of the present technology. The pixel 300 of the second modification of the second embodiment is different from that of the second embodiment in that a switch 336 is provided instead of the switches 317 and 318.

The switch 336 is inserted between a capacitance 331 in the differentiator circuit 330 and an input terminal 391 of an inverting circuit. The switch 336 transitions to an open state in a case of being set to be disabled by enable information EN and transitions to a close state in a case of being set to be enabled by the enable information EN. The transition to the open state of the switch 336 cuts off a differential signal Vout and can suppress erroneous detection of an address event.

Note that each of the first to sixth modifications of the first embodiment can be applied to the solid-state image sensor 200 of the second modification of the second embodiment.

As described above, according to the second modification of the second embodiment of the present technology, since the switch 336 is provided in the differentiator circuit 330, the differential signal Vout can be cut off. As a result, erroneous detection of an address event can be suppressed.

Third Modification

In the above-described second embodiment, the current has been cut off by the switches 317 and 318, but there is a possibility that noise occurs in the rear-stage circuit of the buffer 320 or of the subsequent elements and an address event is erroneously detected. The solid-state image sensor 200 according to a third modification of the second embodiment is different from that of the second embodiment in that a switch is inserted to the circuit of the buffer 320 or a subsequent element.

Figure 21:
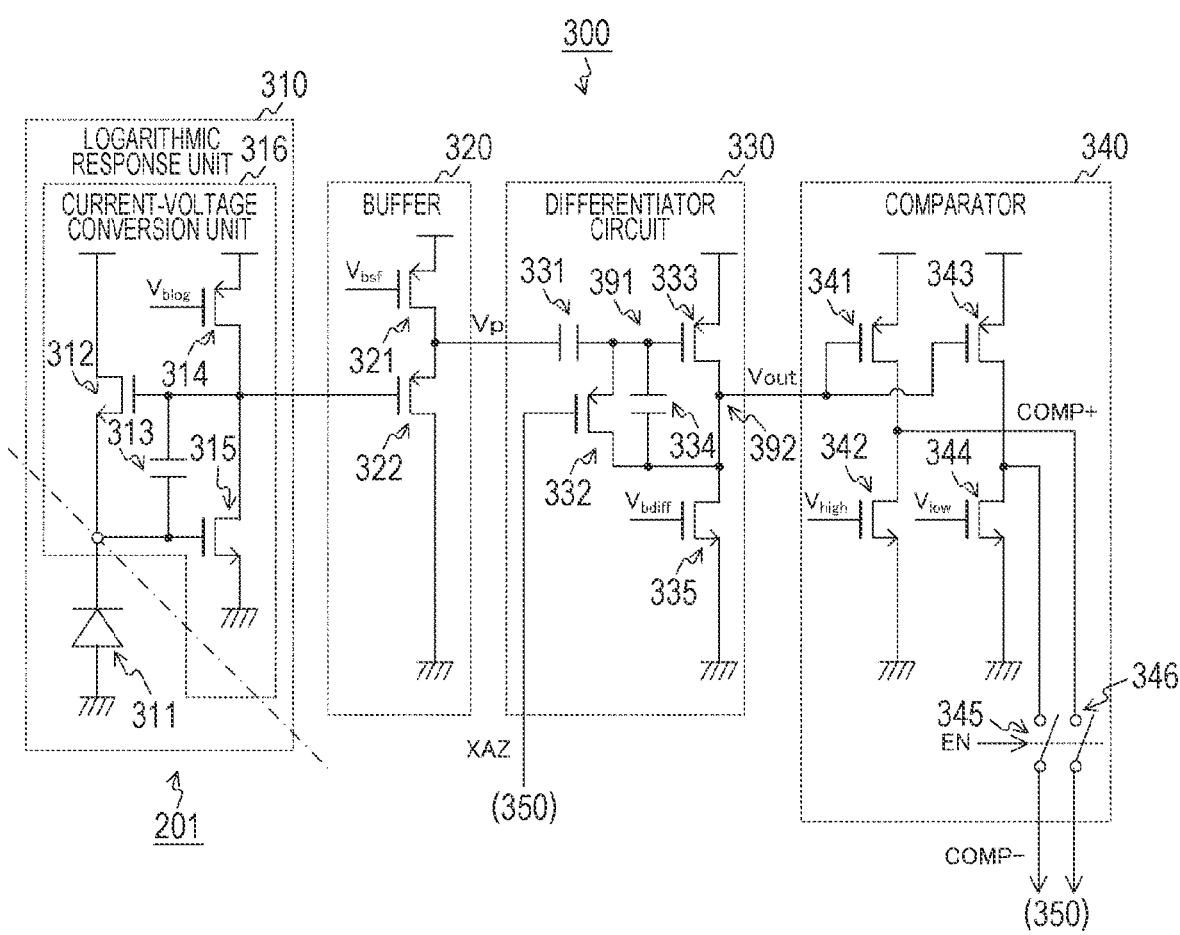
FIG. 21 is a circuit diagram illustrating a configuration example of the logarithmic response unit, the buffer, the differentiator circuit, and the comparator according to a third modification of the second embodiment of the present technology.

FIG. 21 is a circuit diagram illustrating a configuration example of the logarithmic response unit 310, the buffer 320, the differentiator circuit 330, and the comparator 340 according to the third modification of the second embodiment of the present technology. The pixel 300 of the third modification of the second embodiment is different from that of the second embodiment in that switches 345 and 346 are provided instead of the switches 317 and 318.

The switch 346 is inserted between a connection point of a P-type transistor 341 and an N-type transistor 342 (in other words, an output node of the comparator 340) and a transfer unit 350. The switch 345 is inserted between a connection point of the P-type transistor 343 and an N-type transistor 344 (the output node of the comparator 340) and the transfer unit 350.

The switches 345 and 346 transition to an open state in a case of being set to be disabled by enable information EN and transition to a close state in a case of being set to be enabled by the enable information EN. The transitions to the open state of the switches 345 and 346 cut off a comparison result of the comparator 340 and can suppress erroneous detection of an address event.

Note that the pixel 300 detects both the on-event and off-event, but the pixel 300 can detect only one of them. In this case, the element for detection the other of them is reduced. For example, in the case of detecting only the on-event, the P-type transistor 343 and the N-type transistor 344, and the switch 345 become unnecessary.

Furthermore, each of the first to sixth modifications of the first embodiment can be applied to the solid-state image sensor 200 of the third modification of the second embodiment.

As described above, according to the third modification of the second embodiment of the present technology, since the switches 345 and 346 are inserted on the output side of the comparator 340, the comparison result of the comparator 340 can be cut off. As a result, erroneous detection of an address event can be suppressed.

3. Third Embodiment

In the above-described first embodiment, the switch 317 in the disabled pixel has been set to the open state, and the value of the detection signal has been fixed. However, in this configuration, when the switch 317 in the enabled pixel is set to the close state, the current or voltage value may slightly drop due to an on-resistance of the switch 317. A solid-state image sensor 200 according to a third embodiment is different from that of the first embodiment in that a switch that is opened when set to be enabled is inserted.

Figure 22:
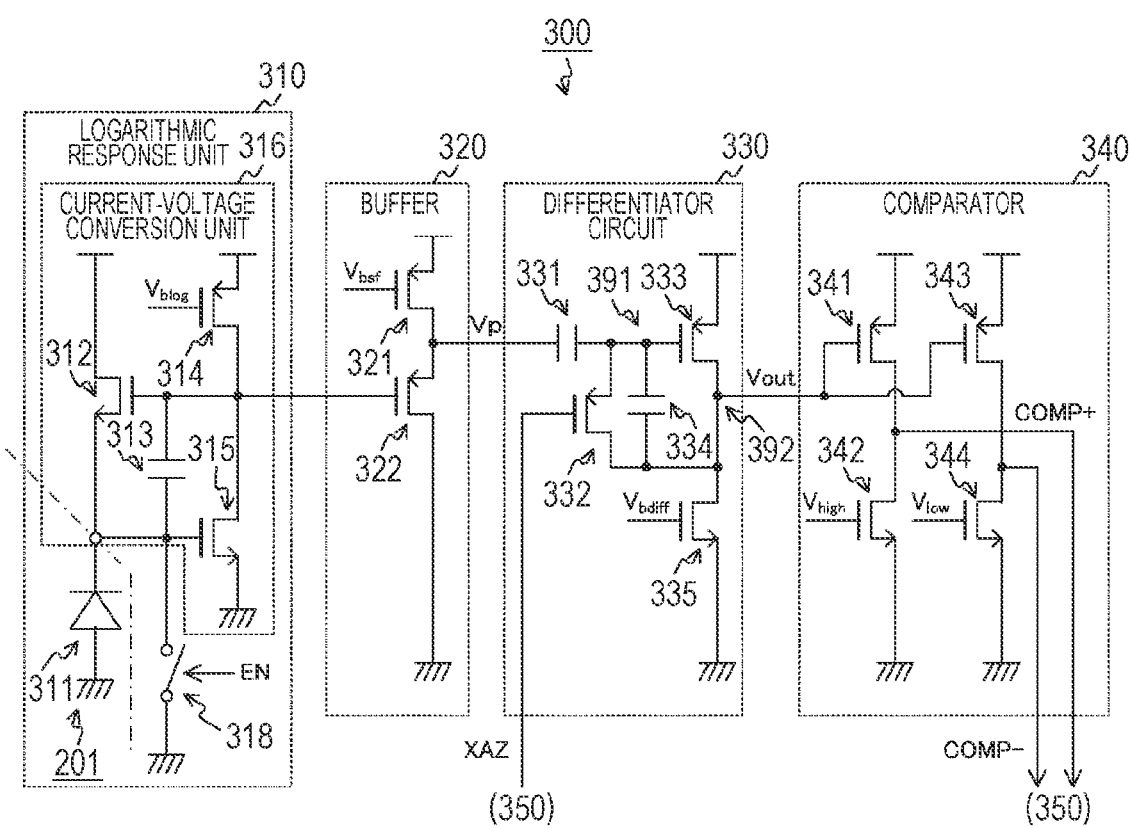
FIG. 22 is a circuit diagram illustrating a configuration example of a logarithmic response unit, a buffer, a differentiator circuit, and a comparator according to a third embodiment of the present technology.

FIG. 22 is a circuit diagram illustrating a configuration example of a logarithmic response unit 310, a buffer 320, a differentiator circuit 330, and a comparator 340 according to the third embodiment of the present technology. The logarithmic response unit 310 of the third embodiment is provided with a switch 318 instead of the switch 317.

The switch 318 is inserted between a connection point of a photoelectric conversion element 311 and a current-voltage conversion unit 316 and a reference terminal (ground terminal or the like). The switch 318 transitions to a close state in a case of being set to be disabled by enable information EN and transitions to an open state in a case of being set to be enabled by the enable information EN. The transition to the close state of the switch 318 stops a photocurrent from flowing into an input side of the current-voltage conversion unit 316, and thus can suppress erroneous detection of an address event. Furthermore, since the switch 318 is not inserted into a path through which the photocurrent flows, the switch 318 does not affect current or voltage values when set to be enabled.

Note that each of the first to sixth modifications of the first embodiment can be applied to the solid-state image sensor 200 of the third embodiment.

As described above, according to the third embodiment of the present technology, the switch 318 that is opened when enabled is inserted between the connection point of the photoelectric conversion element 311 and the current-voltage conversion unit 316, and the reference terminal. Therefore, a decrease in current due to the enabled switch 318 can be suppressed.

First Modification

In the above-described third embodiment, the switch 318 has been provided on the input side of the current-voltage conversion unit 316, but there is a possibility that noise occurs in a rear-stage circuit of the current-voltage conversion unit 316 or of the subsequent elements and an address event is erroneously detected. The solid-state image sensor 200 according to a first modification of the third embodiment is different from that of the third embodiment in that a switch is inserted to the circuit of the current-voltage conversion unit 316 or a subsequent element.

Figure 23:
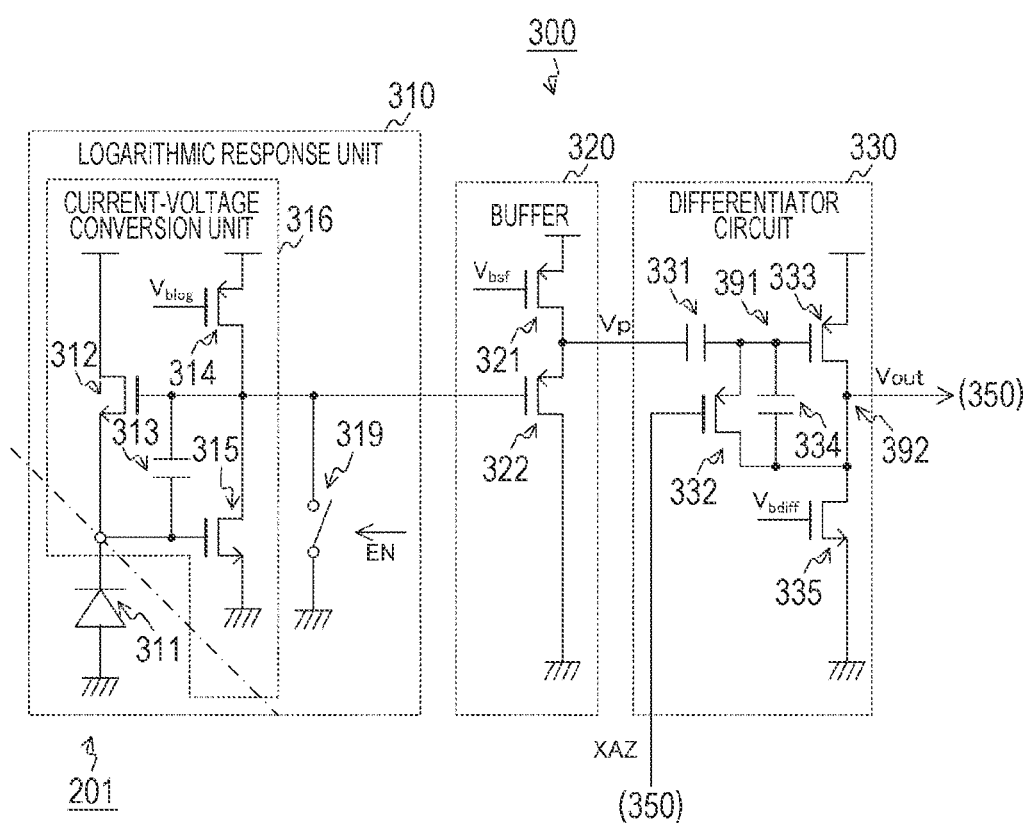
FIG. 23 is a circuit diagram illustrating a configuration example of the logarithmic response unit, the buffer, and the differentiator circuit according to a first modification of the third embodiment of the present technology.

FIG. 23 is a circuit diagram illustrating a configuration example of the logarithmic response unit 310, the buffer 320, and the differentiator circuit 330 according to the first modification of the third embodiment of the present technology. The logarithmic response unit 310 of the first modification of the third embodiment is provided with a switch 319 instead of the switch 318.

The switch 319 is inserted between a connection point of the current-voltage conversion unit 316 and the buffer 320 and the reference terminal. The switch 319 transitions to the close state in the case of being set to be disabled by the enable information EN and transitions to the open state in the case of being set to be enabled by the enable information EN. The transition to the close state of the switch 319 can suppress erroneous detection of an address event because a pixel voltage Vp input to the buffer 320 becomes a reference potential (ground potential or the like).

Note that each of the first to sixth modifications of the first embodiment can be applied to the solid-state image sensor 200 of the first modification of the third embodiment.

As described above, according to the first modification of the third embodiment of the present technology, since the switch 319 is inserted between the connection point of the current-voltage conversion unit 316 and the buffer 320 and the reference terminal, erroneous detection due to noise generated in the current-voltage conversion unit 316 can be suppressed.

Second Modification

In the above-described third embodiment, the switch 318 has been provided on the input side of the current-voltage conversion unit 316, but there is a possibility that noise occurs in a rear-stage circuit of the current-voltage conversion unit 316 or of the subsequent elements and an address event is erroneously detected. The solid-state image sensor 200 according to a second modification of the third embodiment is different from that of the third embodiment in that a switch is inserted to the circuit of the current-voltage conversion unit 316 or a subsequent element.

Figure 24:
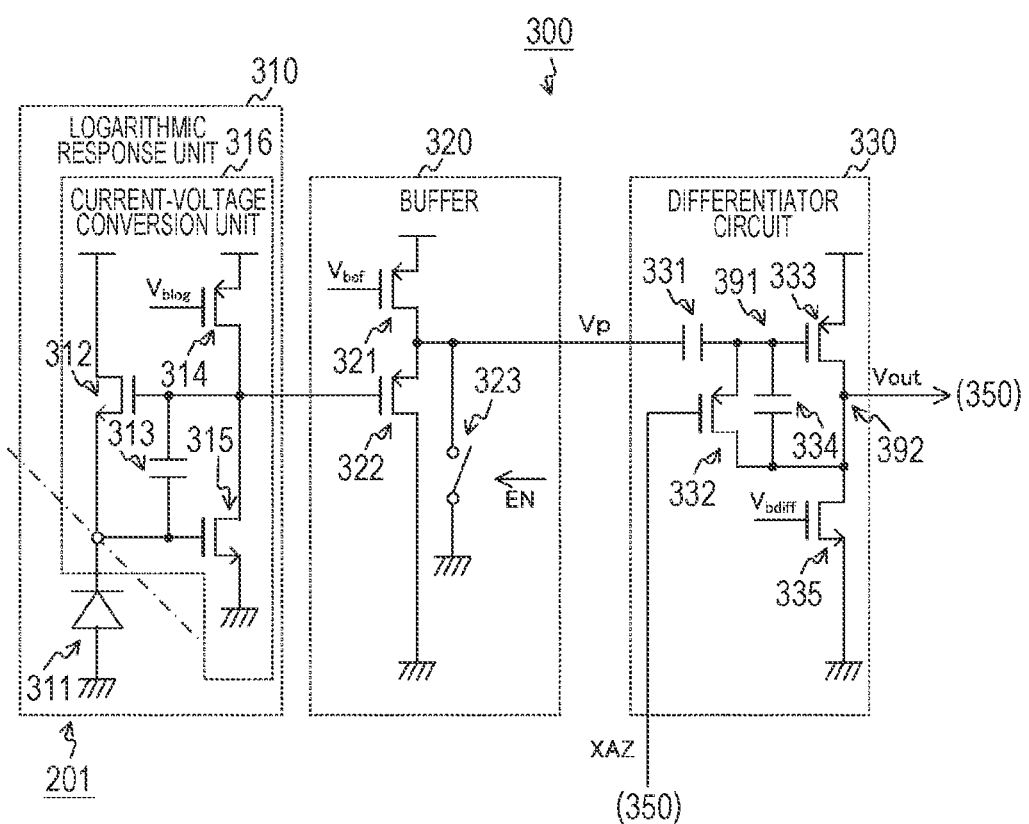
FIG. 24 is a circuit diagram illustrating a configuration example of the logarithmic response unit, the buffer, and the differentiator circuit according to a second modification of the third embodiment of the present technology.

FIG. 24 is a circuit diagram illustrating a configuration example of the logarithmic response unit 310, the buffer 320, and the differentiator circuit 330 according to the second modification of the third embodiment of the present technology. The pixel 300 of the second modification of the third embodiment is different from that of the third embodiment in that a switch 323 is provided instead of the switch 318.

The switch 323 is inserted between a connection point of the buffer 320 and the differentiator circuit 330, and the reference terminal. The switch 323 transitions to the close state in the case of being set to be disabled by the enable information EN and transitions to the open state in the case of being set to be enabled by the enable information EN. The transition to the close state of the switch 323 can suppress erroneous detection of an address event because the pixel voltage Vp output from the buffer 320 becomes the reference potential (ground potential or the like).

Note that each of the first to sixth modifications of the first embodiment can be applied to the solid-state image sensor 200 of the second modification of the third embodiment.

As described above, according to the second modification of the third embodiment of the present technology, since the switch 323 is inserted between the connection point of the buffer 320 and the differentiator circuit 330 and the reference terminal, erroneous detection due to noise generated in the current-voltage conversion unit 316 or the buffer 320 can be suppressed.

Third Modification

In the above-described third embodiment, the switch 318 has been provided on the input side of the current-voltage conversion unit 316, but there is a possibility that noise occurs in a rear-stage circuit of the current-voltage conversion unit 316 or of the subsequent elements and an address event is erroneously detected. The solid-state image sensor 200 according to a third modification of the third embodiment is different from that of the third embodiment in that a switch is inserted to the circuit of the current-voltage conversion unit 316 or a subsequent element.

Figure 25:
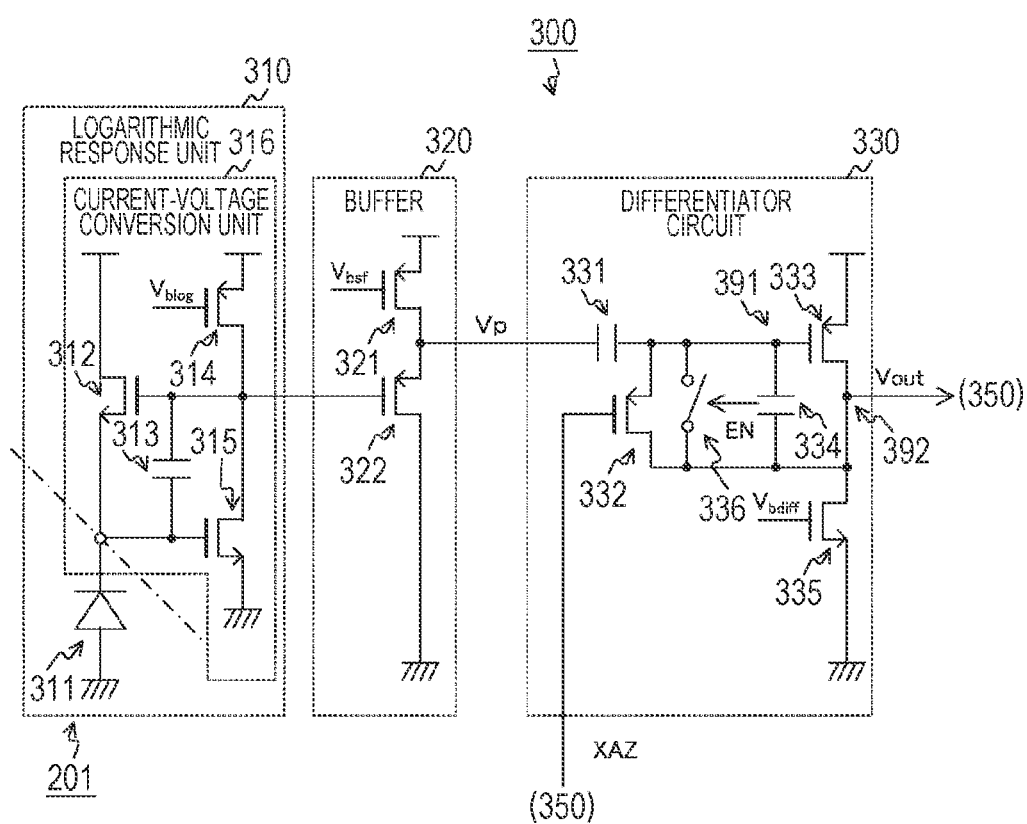
FIG. 25 is a circuit diagram illustrating a configuration example of the logarithmic response unit, the buffer, and the differentiator circuit according to a third modification of the third embodiment of the present technology.

FIG. 25 is a circuit diagram illustrating a configuration example of the logarithmic response unit 310, the buffer 320, and the differentiator circuit 330 according to the third modification of the third embodiment of the present technology. The pixel 300 of the third modification of the third embodiment is different from that of the third embodiment in that a switch 336 is provided instead of the switch 318.

The switch 336 is inserted between an input terminal 391 and an output terminal 392 of an inverting circuit. The switch 336 transitions to the close state in the case of being set to be disabled by the enable information EN and transitions to the open state in the case of being set to be enabled by the enable information EN. The transition to the close state of the switch 336 can suppress erroneous detection of an address event because the differentiator circuit 330 is initialized.

Figure 26:
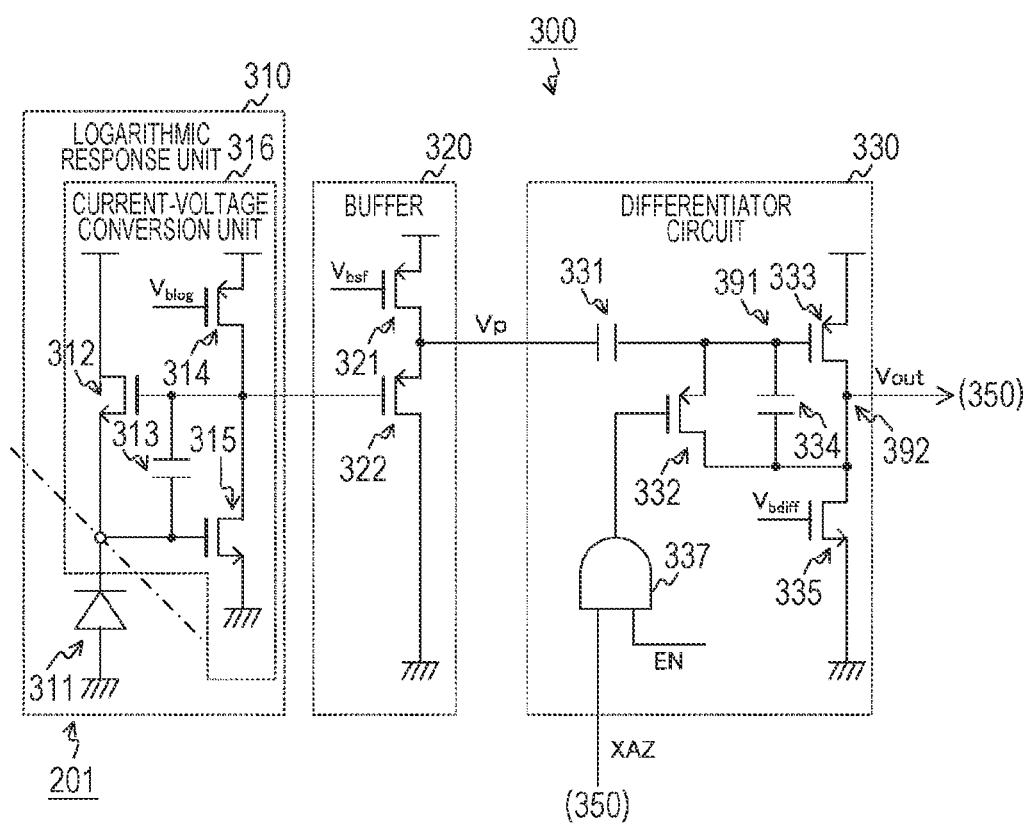
FIG. 26 is a circuit diagram illustrating a configuration example of the logarithmic response unit, the buffer, and the differentiator circuit using a logic gate according to the third modification of the third embodiment of the present technology.

Note that each of the first to sixth modifications of the first embodiment can be applied to the solid-state image sensor 200 of the third modification of the third embodiment. Furthermore, as illustrated in FIG. 26, an AND gate 337 can be arranged instead of the switch 336. The AND gate 337 supplies a logical product of the enable information EN and an auto-zero signal XAZ to a gate of a P-type transistor 332. The AND gate 337 is an example of a switch described in the claims, and the P-type transistor 332 is an example of a short-circuit transistor described in the claims.

As described above, according to the third modification of the third embodiment of the present technology, since the switch 336 is inserted between the input terminal 391 and the output terminal 392 of the inverting circuit, erroneous detection due to noise generated in the current-voltage conversion unit 316 or the buffer 320 can be suppressed.

Fourth Modification

In the above-described third embodiment, the switch 318 has been provided on the input side of the current-voltage conversion unit 316, but there is a possibility that noise occurs in a rear-stage circuit of the current-voltage conversion unit 316 or of the subsequent elements and an address event is erroneously detected. The solid-state image sensor 200 according to a fourth modification of the third embodiment is different from that of the third embodiment in that a switch is inserted to the circuit of the current-voltage conversion unit 316 or a subsequent element.

Figure 27:
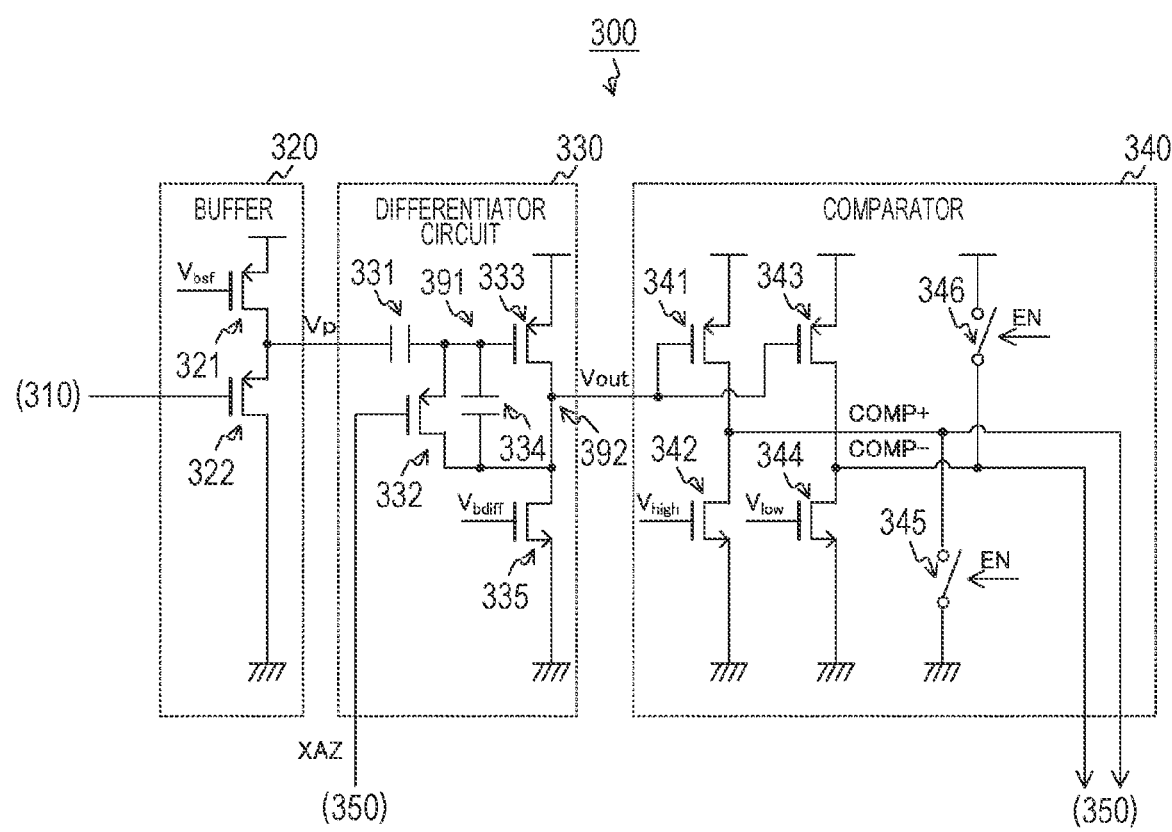
FIG. 27 is a circuit diagram illustrating a configuration example of the buffer, the differentiator circuit, and the comparator according to a fourth modification of the third embodiment of the present technology.

FIG. 27 is a circuit diagram illustrating a configuration example of the buffer 320, the differentiator circuit 330, and the comparator 340 according to the fourth modification of the third embodiment of the present technology. The pixel 300 of the fourth modification of the third embodiment is different from that of the third embodiment in that switches 345 and 346 are provided instead of the switch 318.

The switch 345 is inserted between an output terminal of the comparator 340 that outputs a comparison result COMP+ and the reference terminal. The switch 346 is inserted between the output terminal of the comparator 340 that outputs a comparison result COMP− and a power supply terminal. The switches 345 and 346 transition to the close state in the case of being set to be disabled by the enable information EN and transition to the open state in the case of being set to be enabled by the enable information EN. The transitions to the close state of the switches 345 and 346 can suppress erroneous detection of an address event because the comparison results COMP+ and COMP− are fixed to low level and high level.

Note that the pixel 300 detects both the on-event and off-event, but the pixel 300 can detect only one of them. In this case, the element for detection the other of them is reduced. For example, in the case of detecting only the on-event, an N-type transistor 343 and a P-type transistor 344, and the switch 345 become unnecessary.

Note that each of the first to sixth modifications of the first embodiment can be applied to the solid-state image sensor 200 of the fourth modification of the third embodiment.

As described above, according to the fourth modification of the third embodiment of the present technology, since the switches 345 and 346 are inserted between the output terminal of the comparator 340 and the ground terminal, erroneous detection due to noise generated in the front stage of the comparator 340 can be suppressed.

4. Fourth Embodiment

In the above-described first embodiment, the erroneous detection of the address event due to the static factors such as a defective element has been suppressed by the abnormal pixel determination unit 230 determining the presence or absence of an abnormality in advance before the address event detection processing. However, the erroneous detection of an address event may occur due to the dynamic factors such as irradiation with a flicker light source irradiation. A solid-state image sensor 200 according to a fourth embodiment is different from that of the first embodiment in determining presence or absence of an abnormality during detection of an address event and suppressing erroneous detection of the address event due to a dynamic factor.

Figure 28:
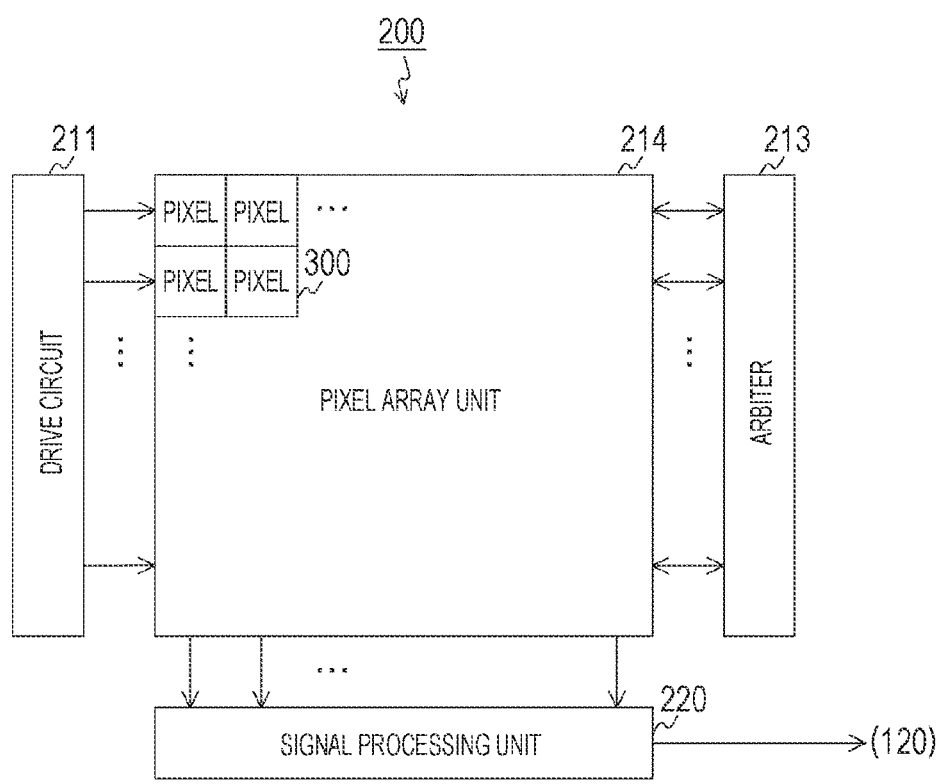
FIG. 28 is a block diagram illustrating a configuration example of a solid-state image sensor according to a fourth embodiment of the present technology.

FIG. 28 is a block diagram illustrating a configuration example of the solid-state image sensor 200 according to the fourth embodiment of the present technology. The solid-state image sensor 200 of the fourth embodiment is different from that of the first embodiment in that an abnormal pixel determination unit 230 and a setting information holding unit 240 are not provided outside a pixel array unit 214. In the fourth embodiment, circuits in the abnormal pixel determination unit 230 and the setting information holding unit 240 are distributed and arranged in pixels 300.

Furthermore, a mode signal MODE is not input to a signal processing unit 220 of the fourth embodiment. In the fourth embodiment, the presence or absence of an abnormality is determined during address event detection processing. The signal processing unit 220 performs signal processing for a detection signal and supplies processed data to the recording unit 120.

Figure 29:
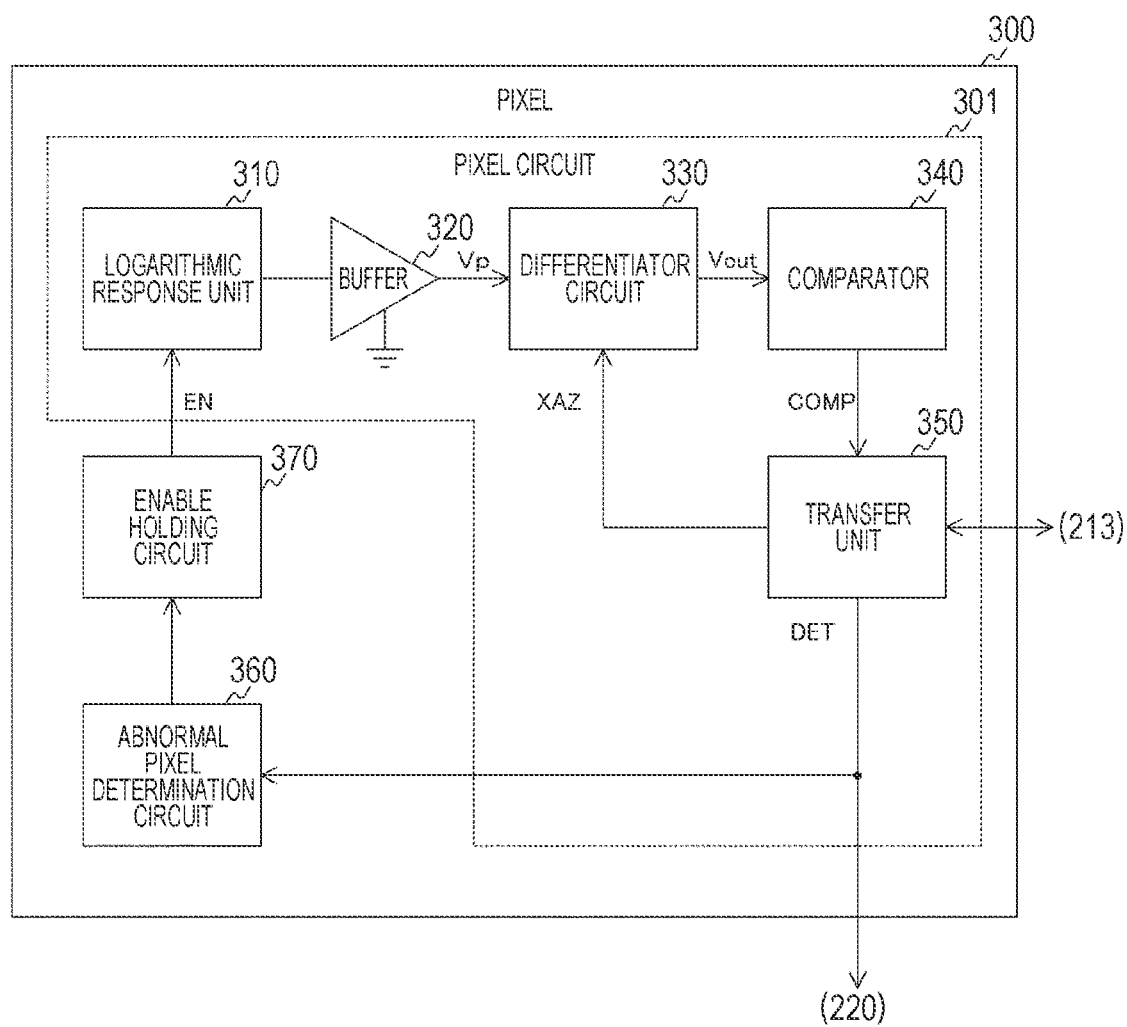
FIG. 29 is a block diagram illustrating a configuration example of a pixel according to the fourth embodiment of the present technology.

FIG. 29 is a block diagram illustrating a configuration example of the pixel 300 according to the fourth embodiment of the present technology. The pixel 300 of the fourth embodiment is different from that of the first embodiment in including an abnormal pixel determination circuit 360 and an enable holding circuit 370 in addition to a pixel circuit 301. Furthermore, a transfer unit 350 of the fourth embodiment also supplies a detection signal DET to the abnormal pixel determination circuit 360.

The abnormal pixel determination circuit 360 determines whether or not the pixel 300 is abnormal. During the address event detection processing, the abnormal pixel determination circuit 360 counts a detection count as in the first embodiment, and determines whether or not the presence or absence of an abnormality according to whether or not a count value exceeds a threshold. The abnormal pixel determination circuit 360 causes the enable holding circuit 370 to hold one-bit enable information.

The enable holding circuit 370 holds the enable information. The enable holding circuit 370 includes, for example, a rewritable memory. A latch circuit, an SRAM, or the like is used as the rewritable memory. Furthermore, the enable holding circuit 370 supplies the enable information to the pixel circuit 301. Note that the enable holding circuit 370 is an example of a control circuit described in the claims.

The abnormal pixel determination circuit 360 determines the presence or absence of an abnormality during the address event detection processing, so that erroneous detection of the address event due to the dynamic factors such as aging deterioration and a flicker light source can be suppressed. Note that the abnormal pixel determination circuit 360 can further determine the presence or absence of an abnormality before the detection processing as in the first embodiment, in addition to the determination for the presence or absence of an abnormality during the detection processing.

Note that the abnormal pixel determination circuit 360 and the enable holding circuit 370 are arranged for each pixel, but these circuits can be collectively arranged outside the pixel array unit 214, as in the first embodiment.

Furthermore, each of the first to sixth modifications of the first embodiment can be applied to the solid-state image sensor 200 of the fourth embodiment. Furthermore, each of the second and third embodiments and the modifications thereof can be applied to the solid-state image sensor 200 of the fourth embodiment.

As described above, according to the fourth embodiment of the present technology, the abnormal pixel determination circuit 360 determines the presence or absence of an abnormality during detection of an address event. Therefore, erroneous detection of the address event due to the dynamic factors can be suppressed.

5. Fifth Embodiment

In the above-described first embodiment, the circuit in the solid-state image sensor 200 has determined the presence or absence of an abnormality, but the function to determine the presence or absence of an abnormality can be implemented by a computer executing a program. A solid-state image sensor 200 according to a fifth embodiment is different from that of the first embodiment in using a program that executes a procedure for determining the presence or absence of an abnormality.

Figure 30:
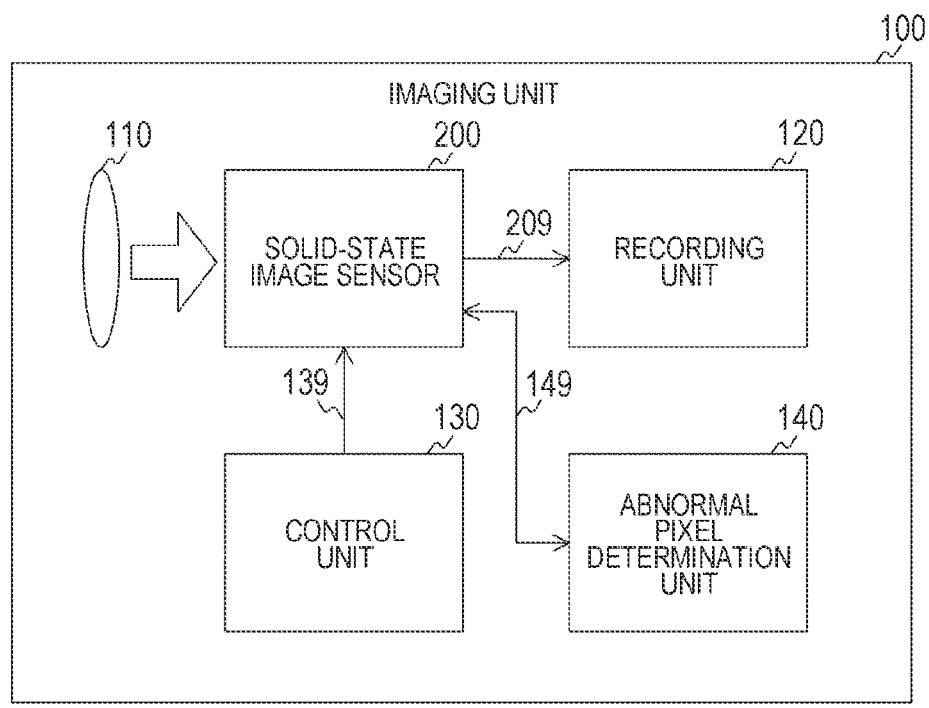
FIG. 30 is a block diagram illustrating a configuration example of an imaging device according to a fifth embodiment of the present technology.

FIG. 30 is a block diagram illustrating a configuration example of an imaging device 100 according to the fifth embodiment of the present technology. The imaging device 100 is different from that of the first embodiment in further including an abnormal pixel determination unit 140.

The abnormal pixel determination unit 140 determines the presence or absence of an abnormality for each pixel. The method for determining the abnormal pixel is similar to that of the fourth embodiment for dynamically determining the presence or absence of an abnormality. Note that the abnormal pixel determination unit 140 can also statically determine the presence or absence of an abnormality as in the first embodiment.

Furthermore, the abnormal pixel determination unit 140 is implemented by a processing device such as a CPU executing a predetermined program. Therefore, it is not necessary to provide a circuit for determining the presence or absence of an abnormality in the solid-state image sensor 200, and the circuit scale can be reduced accordingly.

Figure 31:
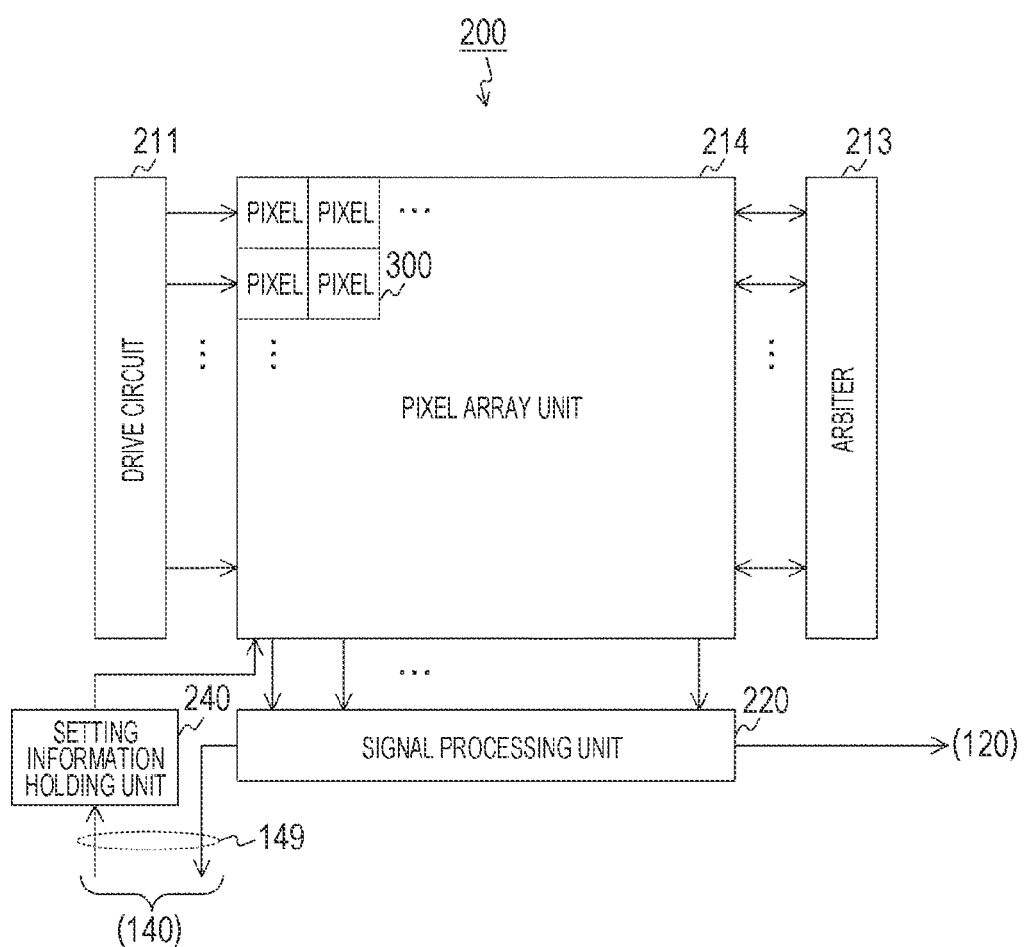
FIG. 31 is a block diagram illustrating a configuration example of a solid-state image sensor according to the fifth embodiment of the present technology.

FIG. 31 is a block diagram illustrating a configuration example of the solid-state image sensor 200 according to the fifth embodiment of the present technology. The solid-state image sensor 200 of the fifth embodiment is different from that of the first embodiment in that the abnormal pixel determination unit 230 is not provided.

A signal processing unit 220 of the fifth embodiment supplies a detection signal to the abnormal pixel determination unit 140 in an abnormality determination mode. Furthermore, setting information from the abnormal pixel determination unit 140 is input to a setting information holding unit 240.

Note that each of the first to sixth modifications of the first embodiment can be applied to the solid-state image sensor 200 of the fifth embodiment. Furthermore, each of the second and third embodiments and the modifications thereof can be applied to the solid-state image sensor 200 of the fifth embodiment.

As described above, according to the fifth embodiment of the present technology, since the program for executing the procedure for determining the presence or absence of an abnormality is used, the circuit for determining the presence or absence of an abnormality is not necessary, and the circuit scale of the solid-state image sensor 200 can be reduced.

6. Applications to Moving Bodies

The technology according to the present disclosure (present technology) can be applied to various products. For example, the technology according to the present disclosure may be realized as a device mounted on any type of moving bodies including an automobile, an electric automobile, a hybrid electric automobile, a motorcycle, a bicycle, a personal mobility, an airplane, a drone, a ship, a robot, and the like.

Figure 32:
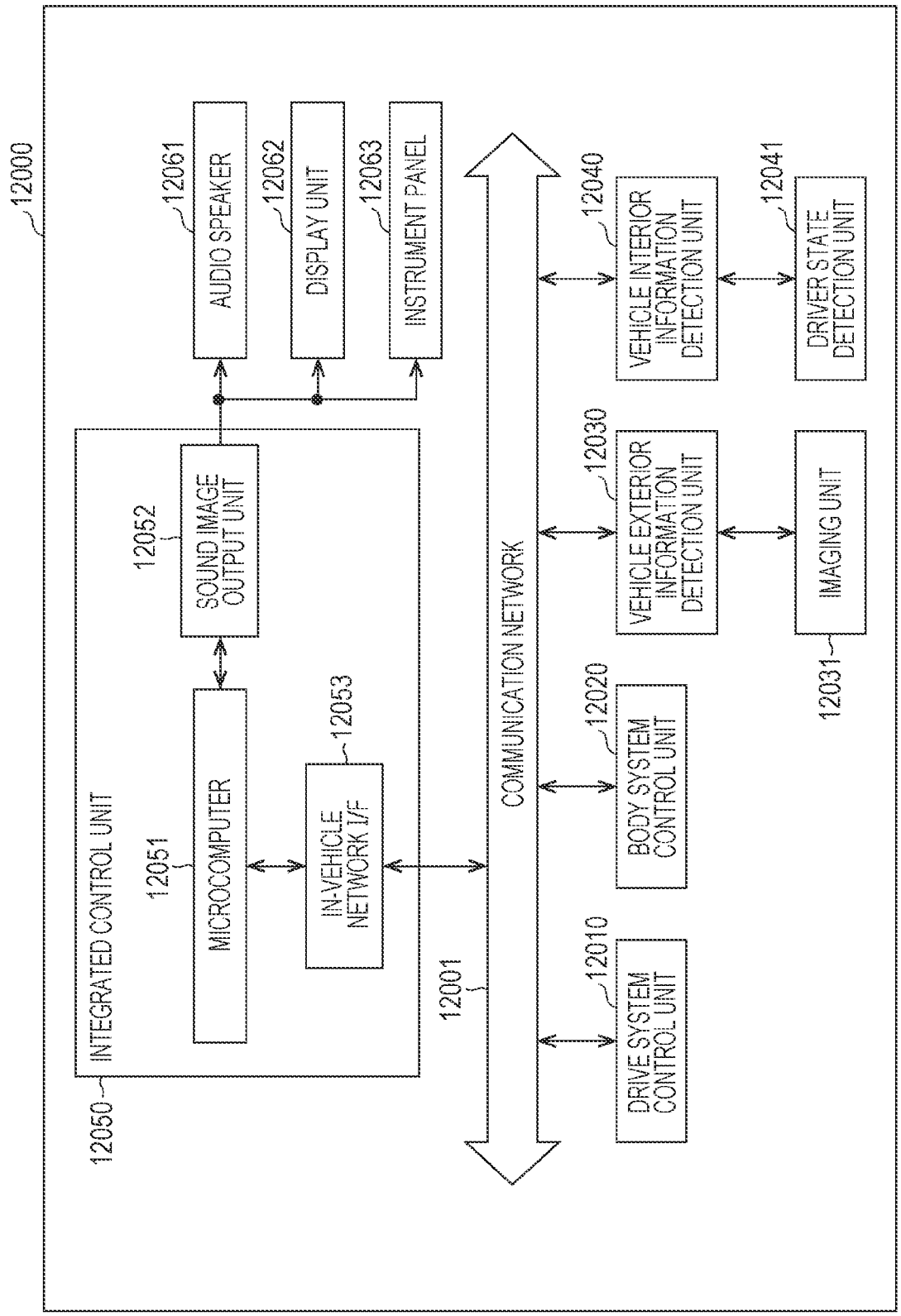
FIG. 32 is a block diagram illustrating a schematic configuration of a vehicle control system.

FIG. 32 is a block diagram illustrating a schematic configuration example of a vehicle control system as an example of a moving body control system to which the technology according to the present disclosure is applicable.

A vehicle control system 12000 includes a plurality of electronic control units connected through a communication network 12001. In the example illustrated in FIG. 32, the vehicle control system 12000 includes a drive system control unit 12010, a body system control unit 12020, a vehicle exterior information detection unit 12030, a vehicle interior information detection unit 12040, and an integrated control unit 12050. Furthermore, as functional configurations of the integrated control unit 12050, a microcomputer 12051, a sound image output unit 12052, and an in-vehicle network interface (I/F) 12053 are illustrated.

The drive system control unit 12010 controls operations of devices regarding a drive system of a vehicle according to various programs. For example, the drive system control unit 12010 functions as a control device of a drive force generation device for generating drive force of a vehicle, such as an internal combustion engine or a drive motor, a drive force transmission mechanism for transmitting drive force to wheels, a steering mechanism that adjusts a steering angle of a vehicle, a braking device that generates braking force of a vehicle, and the like.

The body system control unit 12020 controls operations of various devices equipped in a vehicle body according to various programs. For example, the body system control unit 12020 functions as a control device of a keyless entry system, a smart key system, an automatic window device, and various lamps such as head lamps, back lamps, brake lamps, turn signals, and fog lamps. In this case, radio waves transmitted from a mobile device substituted for a key or signals of various switches can be input to the body system control unit 12020. The body system control unit 12020 receives an input of the radio waves or the signals, and controls a door lock device, the automatic window device, the lamps, and the like of the vehicle.

The vehicle exterior information detection unit 12030 detects information outside the vehicle that mounts the vehicle control system 12000. For example, an imaging unit 12031 is connected to the vehicle exterior information detection unit 12030. The vehicle exterior information detection unit 12030 causes the imaging unit 12031 to capture an image outside the vehicle, and receives the captured image. The vehicle exterior information detection unit 12030 may perform object detection processing or distance detection processing of persons, vehicles, obstacles, signs, letters on a road surface, or the like on the basis of the received image.

The imaging unit 12031 is an optical sensor that receives light and outputs an electrical signal according to a light-receiving amount of the light. The imaging unit 12031 can output the electrical signal as an image and can output the electrical signal as information of distance measurement. Furthermore, the light received by the imaging unit 12031 may be visible light or may be non-visible light such as infrared light.

The vehicle interior information detection unit 12040 detects information inside the vehicle. A driver state detection unit 12041 that detects a state of a driver is connected to the vehicle interior information detection unit 12040, for example. The driver state detection unit 12041 includes a camera that captures the driver, for example, and the vehicle interior information detection unit 12040 may calculate the degree of fatigue or the degree of concentration of the driver, or may determine whether or not the driver falls asleep on the basis of the detection information input from the driver state detection unit 12041.

The microcomputer 12051 calculates a control target value of the drive force generation device, the steering mechanism, or the braking device on the basis of the information outside and inside the vehicle acquired in the vehicle exterior information detection unit 12030 or the vehicle interior information detection unit 12040, and can output a control command to the drive system control unit 12010. For example, the microcomputer 12051 can perform cooperative control for the purpose of realization of an advanced driver assistance system (ADAS) function including collision avoidance or shock mitigation of the vehicle, following travel based on an inter-vehicle distance, vehicle speed maintaining travel, collision warning of the vehicle, lane out warning of the vehicle, and the like.

Furthermore, the microcomputer 12051 controls the drive force generation device, the steering mechanism, the braking device, or the like on the basis of the information of a vicinity of the vehicle acquired in the vehicle exterior information detection unit 12030 or the vehicle interior information detection unit 12040 to perform cooperative control for the purpose of automatic drive of autonomous travel without depending on an operation of the driver or the like.

Furthermore, the microcomputer 12051 can output a control command to the body system control unit 12020 on the basis of the information outside the vehicle acquired in the vehicle exterior information detection unit 12030. For example, the microcomputer 12051 can perform cooperative control for the purpose of achievement of non-glare such as by controlling the head lamps according to the position of a leading vehicle or an oncoming vehicle detected in the vehicle exterior information detection unit 12030, and switching high beam light to low beam light.

The sound image output unit 12052 transmits an output signal of at least one of a sound or an image to an output device that can visually and aurally notify a passenger of the vehicle or an outside of the vehicle of information. In the example in FIG. 32, as the output device, an audio speaker 12061, a display unit 12062, and an instrument panel 12063 are exemplarily illustrated. The display unit 12062 may include, for example, at least one of an on-board display or a head-up display.

Figure 33:
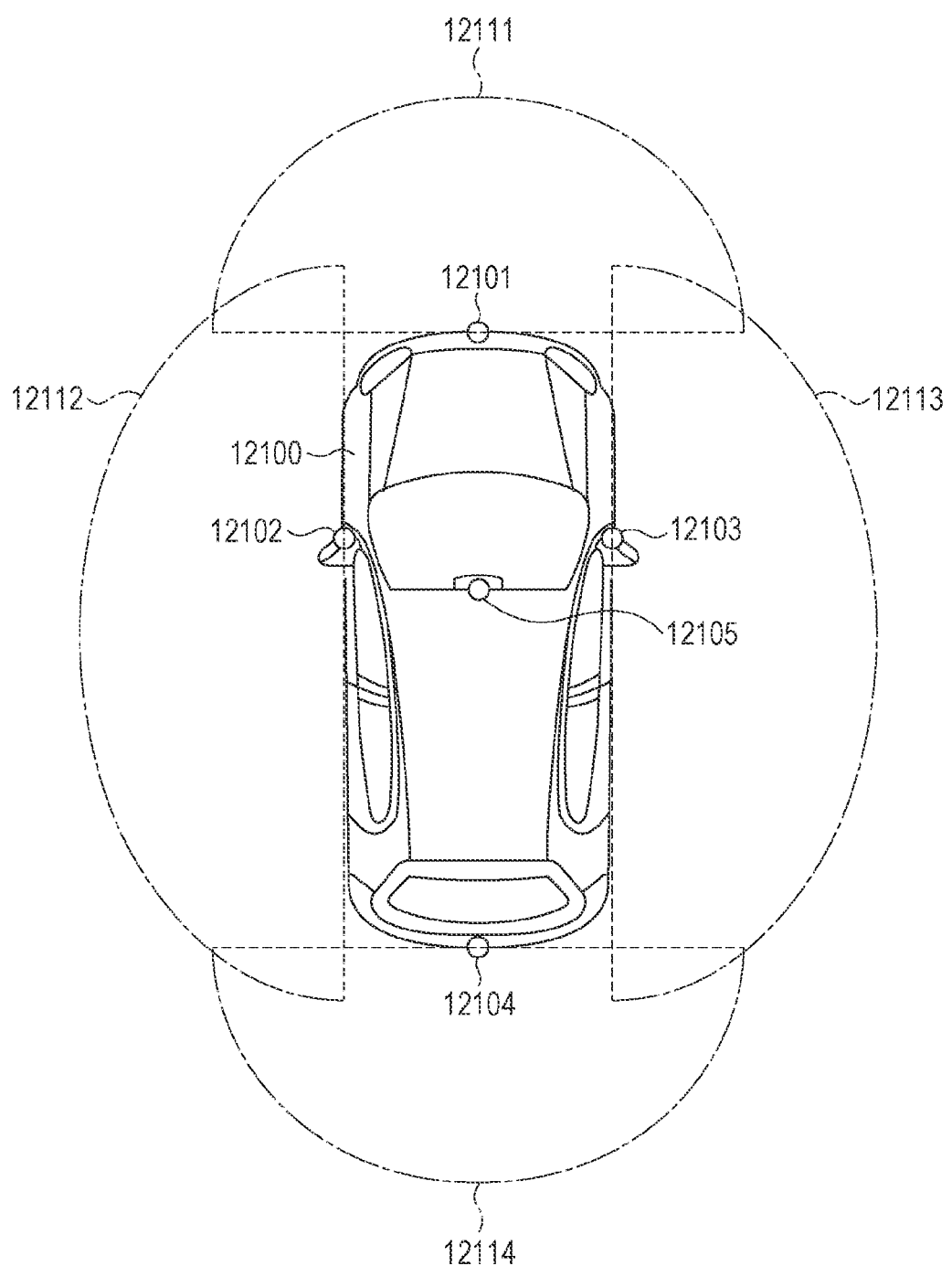
FIG. 33 is an explanatory diagram illustrating an example of installation positions of imaging units.

FIG. 33 is a diagram illustrating an example of an installation position of the imaging unit 12031.

In FIG. 33, imaging units 12101, 12102, 12103, 12104, and 12105 are included as the imaging unit 12031.

The imaging units 12101, 12102, 12103, 12104, and 12105 are provided at positions of a front nose, side mirrors, a rear bumper, a back door, an upper portion of a windshield, and the like in an interior of a vehicle 12100, for example. The imaging unit 12101 provided at the front nose and the imaging unit 12105 provided at an upper portion of the windshield in an interior of the vehicle mainly acquire images in front of the vehicle 12100. The imaging units 12102 and 12103 provided at the side mirrors mainly acquire images on sides of the vehicle 12100. The imaging unit 12104 provided at the rear bumper or the back door mainly acquires images in back of the vehicle 12100. The imaging unit 12105 provided at the upper portion of the windshield in the interior of the vehicle is mainly used for detecting a leading vehicle, a pedestrian, an obstacle, a traffic signal, a traffic sign, a lane, or the like.

Note that FIG. 33 illustrates an example of capture ranges of the imaging units 12101 to 12104. An imaging range 12111 indicates the imaging range of the imaging unit 12101 provided at the front nose, imaging ranges 12112 and 12113 respectively indicate the imaging ranges of the imaging units 12102 and 12103 provided at the side mirrors, and an imaging range 12114 indicates the imaging range of the imaging unit 12104 provided at the rear bumper or the back door. For example, a bird's-eye view image of the vehicle 12100 as viewed from above can be obtained by superimposing image data captured by the imaging units 12101 to 12104.

At least one of the imaging units 12101 to 12104 may have a function to acquire distance information. For example, at least one of the imaging units 12101 to 12104 may be a stereo camera including a plurality of image sensors or may be an image sensor having pixels for phase difference detection.

For example, the microcomputer 12051 obtains distances to three-dimensional objects in the imaging ranges 12111 to 12114 and temporal change of the distances (relative speeds to the vehicle 12100) on the basis of the distance information obtained from the imaging units 12101 to 12104, thereby to extract particularly a three-dimensional object closest to the vehicle 12100 on a traveling road and traveling at a predetermined speed (for example, 0 km/h or more) in substantially the same direction as the vehicle 12100 as a leading vehicle. Moreover, the microcomputer 12051 can set an inter-vehicle distance to be secured from the leading vehicle in advance and perform automatic braking control (including following stop control) and automatic acceleration control (including following start control), and the like. In this way, the cooperative control for the purpose of automatic drive of autonomous travel without depending on an operation of the driver, and the like can be performed.

For example, the microcomputer 12051 classifies three-dimensional object data regarding three-dimensional objects into two-wheeled vehicles, ordinary cars, large vehicles, pedestrians, and other three-dimensional objects such as electric poles to be extracted, on the basis of the distance information obtained from the imaging units 12101 to 12104, and can use the data for automatic avoidance of obstacles. For example, the microcomputer 12051 discriminates obstacles around the vehicle 12100 into obstacles visually recognizable by the driver of the vehicle 12100 and obstacles visually unrecognizable by the driver. The microcomputer 12051 then determines a collision risk indicating a risk of collision with each of the obstacles, and can perform drive assist for collision avoidance by outputting warning to the driver through the audio speaker 12061 or the display unit 12062, and performing forced deceleration or avoidance steering through the drive system control unit 12010, in a case where the collision risk is a set value or more and there is a collision possibility.

At least one of the imaging units 12101 to 12104 may be an infrared camera that detects infrared light. For example, the microcomputer 12051 determines whether or not a pedestrian exists in the captured images of the imaging units 12101 to 12104, thereby to recognize the pedestrian. Such recognition of a pedestrian is performed by a process of extracting characteristic points in the captured images of the imaging units 12101 to 12104, as the infrared camera, for example, and by a process of performing pattern matching processing for the series of characteristic points indicating a contour of an object and determining whether or not the object is a pedestrian. When the microcomputer 12051 determines that a pedestrian exists in the captured images of the imaging units 12101 to 12104 and recognizes the pedestrian, the sound image output unit 12052 causes the display unit 12062 to superimpose and display a square contour line for emphasis on the recognized pedestrian. Furthermore, the sound image output unit 12052 may cause the display unit 12062 to display an icon or the like representing the pedestrian at a desired position.

An example of a vehicle control system to which the technology according to the present disclosure is applicable has been described. The technology according to the present disclosure is applicable to the imaging unit 12031, of the above-described configurations. Specifically, the imaging device 100 in FIG. 1 can be applied to the imaging unit 12031. By applying the technology according to the present disclosure to the imaging unit 12031, the erroneous detection of an address event can be suppressed, whereby the reliability of the system can be improved.

Note that the above-described embodiments describe an example for embodying the present technology, and the matters in the embodiments and the matters used to specify the invention in the claims have corresponding relationships with each other. Similarly, the matters used to specify the invention in the claims and the matters in the embodiment of the present technology given the same names have corresponding relationships with each other. However, the present technology is not limited to the embodiments, and can be embodied by application of various modifications to the embodiments without departing from the gist of the present technology.

Furthermore, the processing procedures described in the above embodiments may be regarded as a method having these series of procedures, and also regarded as a program for causing a computer to execute these series of procedures and as a recording medium for storing the program. As this recording medium, for example, a compact disc (CD), a MiniDisc (MD), a digital versatile disc (DVD), a memory card, a Blu-ray (registered trademark) disc, or the like can be used.

Note that the effects described in the present specification are merely examples and are not limited, and other effects may be exhibited.

Note that the present technology can also have the following configurations.

(1) A solid-state image sensor including:

a plurality of pixel circuits each configured to execute detection processing of detecting whether or not a change amount of an incident light amount exceeds a predetermined threshold and outputting a detection result;

an abnormal pixel determination unit configured to determine whether or not each of the plurality of pixel circuits has an abnormality, and set a pixel circuit without the abnormality to be enabled and set a pixel circuit with the abnormality to be disabled; and a control unit configured to perform control of causing the pixel circuit set to be enabled to execute the detection processing and control of fixing the detection result of the pixel circuit set to be disabled to a specific value.

(2) The solid-state image sensor according to (1), in which each of the plurality of pixel circuits includes a logarithmic response unit in which a photoelectric conversion element configured to generate a photocurrent by photoelectric conversion and a current-voltage conversion unit configured to convert the photocurrent into a voltage are arranged, a buffer configured to output the voltage, a differentiator circuit configured to generate a differential signal indicating a change amount of the output voltage by differential operation, a comparator configured to compare the differential signal with the threshold, and a transfer unit configured to transfer a comparison result of the comparator as the detection result, and any of the logarithmic response unit, the buffer, the differentiator circuit, and the comparator includes a switch that opens or closes a predetermined path according to control of the control unit.

(3) The solid-state image sensor according to (2), in which the control unit controls the switch of the pixel circuit set to be disabled to be in an open state.

(4) The solid-state image sensor according to (3), in which the switch is inserted between the photoelectric conversion element and the current-voltage conversion unit.

(5) The solid-state image sensor according to (3), in which
the current-voltage conversion unit includes a transistor and a switch connected in series to the photoelectric conversion element, and
the switch is inserted in at least one of a path between the photoelectric conversion element and the transistor or a path between the transistor and a power supply terminal.

(6) The solid-state image sensor according to (3), in which
the buffer includes first and second transistors connected in series, and
the switch is inserted at least one of between the first and second transistors or between a connection point of the first and second transistors and the differentiator circuit.

(7) The solid-state image sensor according to (3), in which
the differentiator circuit includes
a capacitance configured to output a charge according to the change amount of the voltage to a predetermined input terminal, and
an inverting circuit configured to output a signal of an inverted voltage of the input terminal as the differential signal, and
the switch is inserted between the capacitance and the input terminal.

(8) The solid-state image sensor according to (3), in which
the switch is inserted between an output node of the comparator and the transfer unit.

(9) The solid-state image sensor according to (2), in which
the switch controls the switch of the pixel circuit set to be disabled to be in a close state.

(10) The solid-state image sensor according to (9), in which
the switch is inserted between a connection point of the current-voltage conversion unit and the photoelectric conversion element and a predetermined reference terminal.

(11) The solid-state image sensor according to (9), in which
the switch is inserted between a connection point of the current-voltage conversion unit and the buffer and a predetermined reference terminal.

(12) The solid-state image sensor according to (9), in which
the switch is inserted between a connection point of the buffer and the differentiator circuit and a predetermined reference terminal.

(13) The solid-state image sensor according to (9), in which
the differentiator circuit includes
a capacitance configured to output a charge according to the change amount of the voltage to a predetermined input terminal, and
an inverting circuit configured to output a signal of an inverted voltage of the input terminal as the differential signal, and
the switch is inserted between the input terminal and an output terminal of the inverting circuit.

(14) The solid-state image sensor according to (9), in which
the differentiator circuit includes
a capacitance configured to output a charge according to the change amount of the voltage to a predetermined input terminal,
an inverting circuit configured to output a signal of an inverted voltage of the input terminal as the differential signal, and
a short-circuit transistor configured to short-circuit the input terminal and an output terminal of the inverting circuit according to an auto-zero signal from the transfer unit, the auto-zero signal instructing initialization, and
the switch is inserted between a gate of the short-circuit transistor and the transfer unit.

(15) The solid-state image sensor according to (9), in which
the switch is inserted between an output terminal of the comparator and a predetermined terminal.

(16) The solid-state image sensor according to any one of (1) to (15), in which
the abnormal pixel determination unit determines whether or not each of the plurality of pixel circuits has an abnormality before execution of the detection processing.

(17) The solid-state image sensor according to any one of (1) to (16), in which
the abnormal pixel determination unit determines whether or not each of the plurality of pixel circuits has an abnormality during execution of the detection processing.

(18) The solid-state image sensor according to any one of (1) to (17), in which
the abnormal pixel determination unit includes a plurality of abnormal pixel determination circuits, the plurality of abnormal pixel determination circuits is arranged in the pixels different from one another, and
the plurality of pixel circuits is arranged in pixels different from one another.

(19) The solid-state image sensor according to any one of (1) to (18), in which
the specific value is a value indicating that the change amount does not exceed the threshold.

(20) An imaging device including:
a plurality of pixel circuits each configured to execute detection processing of detecting whether or not a change amount of an incident light amount exceeds a predetermined threshold and outputting a detection result;
an abnormal pixel determination unit configured to determine whether or not each of the plurality of pixel circuits has an abnormality, and set a pixel circuit without the abnormality to be enabled and set a pixel circuit with the abnormality to be disabled;
a control unit configured to perform control of causing the pixel circuit set to be enabled to execute the detection processing and control of fixing the detection result of the pixel circuit set to be disabled to a specific value; and
a signal processing unit configured to process the detection result.

REFERENCE SIGNS LIST

100 Imaging device
110 Imaging lens
120 Recording unit
130 Control unit
140, 230 Abnormal pixel determination unit
200 Solid-state image sensor
201 Light-receiving chip
202 Circuit chip
211 Drive circuit
213 Arbiter
214 Pixel array unit
220 Signal processing unit
221 Selector
222 Signal processing circuit
231 Detection count counting unit
232 Threshold comparison unit
233 Counter
234 n-th digit output unit 235, 317, 318, 319, 323, 324, 336, 345, 346 Switch
240 Setting information holding unit
300 Pixel
301 Pixel circuit
310 Logarithmic response unit
311 Photoelectric conversion element
312, 315, 335, 342, 344 N-type transistor
313, 331, 334 Capacitance
314, 321, 322, 332, 333, 341, 343 P-type transistor
316 Current-voltage conversion unit
320 Buffer
330 Differentiator circuit
337 AND (logical product) gate
340 Comparator
350 Transfer unit
360 Abnormal pixel determination circuit
370 Enable holding circuit
12031 Imaging unit

The invention claimed is:

1. A solid-state image sensor comprising:
a plurality of pixel circuits each configured to execute detection processing of detecting whether or not a change amount of an incident light amount exceeds a predetermined threshold and to output a detection result;
an abnormal pixel determination circuit configured to determine whether or not each of the plurality of pixel circuits has an abnormality, and set a pixel circuit without the abnormality to be enabled and set a pixel circuit with the abnormality to be disabled; and
a controller configured to perform control of causing the pixel circuit set to be enabled to execute the detection processing and control of fixing the detection result of the pixel circuit set to be disabled to a specific value, wherein
each of the plurality of pixel circuits includes
a logarithmic response circuit in which a photoelectric conversion element configured to generate a photocurrent by photoelectric conversion and a current-voltage conversion circuit configured to convert the photocurrent into a voltage are arranged,
a buffer configured to receive the voltage and then output the voltage as an output voltage,
a differentiator circuit configured to receive the output voltage and to generate a differential signal indicating a change amount of the output voltage by differential operation,
a comparator configured to compare the differential signal with the threshold, and
a transfer circuit configured to transfer a comparison result of the comparator as the detection result, and
at least one of the logarithmic response circuit, the buffer, the differentiator circuit, or the comparator includes a switch that opens or closes a predetermined path according to control of the controller.

2. The solid-state image sensor according to claim 1, wherein
the controller controls the switch of the pixel circuit set to be disabled to be in an open state.

3. The solid-state image sensor according to claim 2, wherein
the switch is inserted between the photoelectric conversion element and the current-voltage conversion circuit.

4. The solid-state image sensor according to claim 2, wherein
the current-voltage conversion circuit includes a transistor and a switch connected in series to the photoelectric conversion element, and
the switch is inserted in at least one of a path between the photoelectric conversion element and the transistor or a path between the transistor and a power supply terminal.

5. The solid-state image sensor according to claim 2, wherein
the buffer includes first and second transistors connected in series, and
the switch is inserted at least one of between the first and second transistors or between a connection point of the first and second transistors and the differentiator circuit.

6. The solid-state image sensor according to claim 2, wherein
the differentiator circuit includes
a capacitance configured to output a charge according to the change amount of the output voltage to a predetermined input terminal, and
an inverting circuit configured to output a signal of an inverted voltage of the input terminal as the differential signal, and
the switch is inserted between the capacitance and the input terminal.

7. The solid-state image sensor according to claim 2, wherein
the switch is inserted between an output node of the comparator and the transfer unit circuit.

8. The solid-state image sensor according to claim 1, wherein the switch controls the switch of the pixel circuit set to be disabled to be in a close state.

9. The solid-state image sensor according to claim 8, wherein the switch is inserted between a connection point of the current-voltage conversion circuit and the photoelectric conversion element and a predetermined reference terminal.

10. The solid-state image sensor according to claim 8, wherein the switch is inserted between a connection point of the current-voltage conversion circuit and the buffer and a predetermined reference terminal.

11. The solid-state image sensor according to claim 8, wherein
the switch is inserted between a connection point of the buffer and the differentiator circuit and a predetermined reference terminal.

12. The solid-state image sensor according to claim 8, wherein
the differentiator circuit includes
a capacitance configured to output a charge according to the change amount of the output voltage to a predetermined input terminal, and
an inverting circuit configured to output a signal of an inverted voltage of the input terminal as the differential signal, and
the switch is inserted between the input terminal and an output terminal of the inverting circuit.

13. The solid-state image sensor according to claim 8, wherein
the differentiator circuit includes
a capacitance configured to output a charge according to the change amount of the output voltage to a predetermined input terminal, an inverting circuit configured to output a signal of an inverted voltage of the input terminal as the differential signal, and a short-circuit transistor configured to short-circuit the input terminal and an output terminal of the inverting circuit according to an auto-zero signal from the transfer circuit, the auto-zero signal instructing initialization, and the switch is inserted between a gate of the short-circuit transistor and the transfer circuit.

14. The solid-state image sensor according to claim 8, wherein the switch is inserted between an output terminal of the comparator and a predetermined terminal.

15. The solid-state image sensor according to claim 1, wherein the abnormal pixel determination circuit determines whether or not each of the plurality of pixel circuits has an abnormality before execution of the detection processing.

16. The solid-state image sensor according to claim 1, wherein the abnormal pixel determination circuit determines whether or not each of the plurality of pixel circuits has an abnormality during execution of the detection processing.

17. The solid-state image sensor according to claim 1, wherein the abnormal pixel determination circuit is one of a plurality of abnormal pixel determination circuits, the plurality of abnormal pixel determination circuits is arranged in the pixels different from one another, and the plurality of pixel circuits is arranged in pixels different from one another.

18. The solid-state image sensor according to claim 1, wherein the specific value is a value indicating that the change amount does not exceed the threshold.

19. An imaging device comprising the solid-state image sensor according to claim 1.

* * * * *